United States Patent
Gordin et al.

(10) Patent No.: US 8,602,588 B2
(45) Date of Patent: Dec. 10, 2013

(54) METHOD, SYSTEM, AND APPARATUS FOR HIGHLY CONTROLLED LIGHT DISTRIBUTION FROM LIGHT FIXTURE USING MULTIPLE LIGHT SOURCES (LEDS)

(75) Inventors: Myron Gordin, Oskaloosa, IA (US); Lawrence H. Boxler, Oskaloosa, IA (US); Matthew D. Drost, Oskaloosa, IA (US); Luke C. McKee, Oskaloosa, IA (US); Chris P. Lickiss, Newton, IA (US)

(73) Assignee: Musco Corporation, Oskaloosa, IA (US)

( * ) Notice: Subject to any disclaimer, the term of this patent is extended or adjusted under 35 U.S.C. 154(b) by 828 days.

(21) Appl. No.: 12/639,650

(22) Filed: Dec. 16, 2009

(65) Prior Publication Data

US 2010/0110671 A1    May 6, 2010

Related U.S. Application Data

(63) Continuation-in-part of application No. PCT/US2009/057090, filed on Sep. 16, 2009, which is a continuation-in-part of application No. 12/467,160, filed on May 15, 2009, now Pat. No. 8,356,916.

(60) Provisional application No. 61/097,483, filed on Sep. 16, 2008, provisional application No. 61/054,089, filed on May 16, 2008.

(51) Int. Cl.
    *F21S 19/00*    (2006.01)

(52) U.S. Cl.
    USPC ...... 362/228; 362/243; 362/245; 362/249.02; 362/800

(58) Field of Classification Search
    USPC ............ 362/228, 235, 242, 243, 245, 249.02, 362/800
    See application file for complete search history.

(56) References Cited

U.S. PATENT DOCUMENTS

| 4,450,507 A | 5/1984 | Gordin |
| 5,253,336 A | 10/1993 | Yamada |

(Continued)

FOREIGN PATENT DOCUMENTS

| CA | 2727258 | 12/2009 |
| CN | 101220928 A | 7/2008 |

(Continued)

OTHER PUBLICATIONS

Cree, "Cree® XLamp® XP-E LEDs" Product Family Data Sheet, CLD-DS18 Rev. 12, 2008-2010, 16 pages.

(Continued)

*Primary Examiner* — Stephen F Husar
(74) *Attorney, Agent, or Firm* — McKee, Voorhees & Sease, P.L.C.

(57) ABSTRACT

Disclosed herein are apparatus, methods, and systems for deriving composite beams from a plurality of light sources such as LEDs. Optical units comprising a plurality of light sources, each source having an associated optic which is individually positionable, are developed using optimization techniques that allow for lighting different target areas in an effective manner by rotating or otherwise positioning the reflectors, refractive lenses, TIR lenses, or other lens types to create a composite beam. The apparatus, methods, and systems of lighting herein make it possible to widely vary the types of beams from an available fixture using a small number of optics and fixtures. In some cases, by using a combination of individual beam patterns from the same or different types of light sources, a small set of individual optics may be sufficient to create a majority of the typical and specialized composite beams needed to meet the needs of most lighting projects and target areas.

16 Claims, 40 Drawing Sheets

(56) References Cited

U.S. PATENT DOCUMENTS

| | | |
|---|---|---|
| 5,906,425 A | 5/1999 | Gordin et al. |
| 6,082,878 A | 7/2000 | Doubek et al. |
| 6,250,774 B1 | 6/2001 | Begemann et al. |
| 6,402,337 B1 | 6/2002 | LeVasseur et al. |
| 6,543,911 B1 | 4/2003 | Rizkin et al. |
| 6,679,621 B2 | 1/2004 | West et al. |
| 6,814,470 B2 | 11/2004 | Rizkin et al. |
| 6,899,443 B2 | 5/2005 | Rizkin et al. |
| 6,948,838 B2 | 9/2005 | Kunstler |
| 6,951,418 B2 | 10/2005 | Rizkin et al. |
| 6,953,264 B2 | 10/2005 | Ter-Hovhannisian |
| 7,004,603 B2 | 2/2006 | Knight |
| 7,012,604 B1 | 3/2006 | Christie et al. |
| 7,093,961 B2 | 8/2006 | Bentley et al. |
| 7,229,194 B2 | 6/2007 | Liu et al. |
| 7,385,360 B2 | 6/2008 | Dluzniak |
| 7,429,757 B2 | 9/2008 | Oyama et al. |
| 7,452,108 B2 | 11/2008 | Gordin et al. |
| 7,495,817 B2 | 2/2009 | Hunt |
| 7,503,669 B2 | 3/2009 | Rizkin et al. |
| 7,540,629 B2 | 6/2009 | Steinberg |
| 7,543,941 B2 | 6/2009 | Holder et al. |
| 7,548,376 B2 | 6/2009 | Kim et al. |
| 7,566,147 B2 | 7/2009 | Wilcox et al. |
| 7,618,163 B2 | 11/2009 | Wilcox |
| 7,625,102 B2 | 12/2009 | Koike et al. |
| 7,625,104 B2 | 12/2009 | Zhang et al. |
| 7,637,630 B2 | 12/2009 | Wilcox et al. |
| 7,641,379 B2 | 1/2010 | Gisler |
| 7,654,705 B2 | 2/2010 | Czech et al. |
| 7,744,246 B2 | 6/2010 | Rizkin et al. |
| 7,766,509 B1 | 8/2010 | Laporte |
| 7,857,497 B2 | 12/2010 | Koike et al. |
| 7,959,326 B2 | 6/2011 | Laporte |
| 7,976,194 B2 | 7/2011 | Wilcox et al. |
| 7,976,199 B2 | 7/2011 | Berns et al. |
| 8,002,435 B2 | 8/2011 | Laporte |
| 8,007,131 B2 | 8/2011 | Liu et al. |
| 8,018,457 B2 | 9/2011 | Peterson et al. |
| 8,066,406 B2 | 11/2011 | Boyer et al. |
| 8,092,042 B2 | 1/2012 | Wilcox |
| 2002/0163001 A1 | 11/2002 | Shaddock |
| 2002/0198978 A1 | 12/2002 | Watkins |
| 2003/0156410 A1 | 8/2003 | Ter-Hovhannisian |
| 2003/0210555 A1 | 11/2003 | Cicero et al. |
| 2005/0068765 A1 | 3/2005 | Ertze Encinas et al. |
| 2006/0082989 A1 | 4/2006 | Wang |
| 2006/0158887 A1 | 7/2006 | Holder et al. |
| 2006/0181880 A1 | 8/2006 | Gordin et al. |
| 2006/0291218 A1 | 12/2006 | Pazula |
| 2007/0090362 A1 | 4/2007 | Ahn et al. |
| 2007/0091444 A1 | 4/2007 | Kim et al. |
| 2007/0201225 A1 | 8/2007 | Holder et al. |
| 2008/0037239 A1 | 2/2008 | Thomas et al. |
| 2008/0101063 A1 | 5/2008 | Koike et al. |
| 2008/0191236 A1 | 8/2008 | DeGraaf et al. |
| 2008/0192480 A1 | 8/2008 | Rizkin et al. |
| 2008/0273333 A1 | 11/2008 | Berns et al. |
| 2008/0285273 A1 | 11/2008 | Liu et al. |
| 2009/0007978 A1 | 1/2009 | Alston et al. |
| 2009/0100702 A1 | 4/2009 | Fair |
| 2009/0103299 A1 | 4/2009 | Boyer et al. |
| 2009/0284966 A1 | 11/2009 | Crookham et al. |
| 2009/0322752 A1 | 12/2009 | Peterson et al. |
| 2009/0323330 A1 | 12/2009 | Gordin et al. |
| 2010/0002432 A1 | 1/2010 | Romano |
| 2010/0103668 A1 | 4/2010 | Lueken et al. |
| 2010/0103672 A1 | 4/2010 | Thomas et al. |
| 2010/0290225 A1 | 11/2010 | Rizkin et al. |
| 2011/0083460 A1 | 4/2011 | Thomas et al. |

FOREIGN PATENT DOCUMENTS

| | | |
|---|---|---|
| DE | 20 2008 004790 U1 | 8/2008 |
| WO | WO 01/86198 A1 | 11/2001 |
| WO | WO 2006/114726 A2 | 11/2006 |
| WO | WO 2007/044472 A2 | 4/2007 |
| WO | WO 2008/092271 A1 | 8/2008 |
| WO | WO 2008/106843 A1 | 9/2008 |
| WO | WO 2008/123960 A1 | 10/2008 |
| WO | WO 2010/033545 A2 | 3/2010 |
| WO | WO 2010/033545 A3 | 3/2010 |
| WO | WO 2010/042186 A2 | 4/2010 |
| WO | WO 2010/042186 A3 | 4/2010 |
| WO | WO 2011/123142 A1 | 10/2011 |

OTHER PUBLICATIONS

Cree, "Cree® XLamp® XR-E and XR-C LED" Binning & Labeling, CLD AP12, Rev. 8, 2004-2010, 15 pages.

Color Gel, http://en.wikipedia.org/wiki/color_gel, Mar. 8, 2009, pp. 74-76.

Ledford, Kevin F. "Illuminance Calculations—The Lumen Method", IESNA ED-150.5A, 1993, 72 pages.

"MIRO", Anomet 2006 Brochure, 2 pages.

Paulin, Douglas, "Full Cutoff Lighting: The Benefits", IESNA LD+A/Apr. 2001, pp. 54-56.

Philips, Lumileds "Thermal Design Using LUXEON® Power Light Sources", Application Brief AB05 Jun. 2006, 12 pages.

Philips, "power light source LUXEON® Emitter", Technical Datasheet DS25, May 2007, 19 pages.

Philips, "Radiation Patterns", http://www.lumileds.com/technology/radiationpatterns.cfm [retrieved from Internet on Apr. 28, 2007], 1 page.

Benthin, Carsten, et al., Interactive Headlight Simulation—A Case Study of Interactive Distributed Ray Tracing—, Computer Graphics Group, Saarland University, Technical Report TR-2002-03 (2002) (6 pages).

BetaLED , a Division of RUUD Lighting, Brochure—"uncompromisingBrilliance", www.betaLED.com/spec-sheets.aspx, 2009 (24 pages).

"6.7 Bessel Functions of Fractional Order, Airy Functions, Spherical Bessel Functions", Sample page from Numerical Recipes in Fortran &&: The Art of Scientific Computing (ISBN 0-521-43064-X), pp. 234-245, Copyright 1986-1992 (12 pages).

Cree, Brochure—"Cree XLamp XP-G LEDs—Product Family Data Sheet", CLD-DS20 Rev. 5, pp. 1-12, Copyright 2009-2011 Cree, Inc. (12 pages).

Jin, Xiaogang, et al., "Analytical methods for polynomial weighted convolution surfaces with various kernels", Pergamon, Computers & Graphics 26 (2002) pp. 437-447 (11 pages).

Vose, Michael D., Excerpt from book entitled: "The Simple Genetic Algorithm—Foundations and Theory", The MIT Press, 1999 (139 pages).

Whitley, Darrell, "A Genetic Algorithm Tutorial" Colorado State University, Fort Collins, Colorado , (1994) (37 pages).

Philips Lumileds "Thermal Design Using LUXEON® Power Light Source" Application Brief AB05, Jun. 2006, 12 pages.

"Simple Guidelines for Lighting Regulations for Small Communities, Urban Neighborhood's and Subdivisions" [downloaded from http://www.darksky.org/mc/page.do?sitePageID=58881 on May 16, 2008], 3 pages, copyright 2008.

Musco Corporation, PCT/US2009/057090, International Search report and Written Opinion of International Searching Authority, mailed May 10, 2010, and International Preliminary Report on Patentability dated Jan. 25, 2011.

Musco Corporation, PCT/US2010/034530, International Search report and Written Opinion of International Searching Authority, mailed Apr. 22, 2011, (6 pages).

CN 101220928 A—Shi, Jie—English Abstract, Jul. 16, 2008.

(56) References Cited

OTHER PUBLICATIONS

Musco Corporation et al.,—Annex to the European Search Report on European Patent Application No. EP 09 81 5084 and Supplementary European Search Report, dated Jan. 30, 2012, (5 pages).

Illuminating Engineering Society of North America (IESNA), IESNA Lighting Education, Fundamental Level, IESNA ED-100, TM-11-00, Jun. 1993, 3 pages.

IESNA, Light & Color, IESNA ED-100.1, 2 pages, brochure, Jun. 1993.

Luminit Shaping Light As Needed, "Architectural/Event Lighting Diffusers", pp. 77-78, www.luminitco.com, at least as early as Nov. 2009.

Lumec, A Lumec White Paper—"LEDs for outdoor lighting applications" (May 2006) (11 pages).

Philips-Lumec, Brochure—"LEONIS—Landmark of a new world" (Apr. 2009) (24 pages).

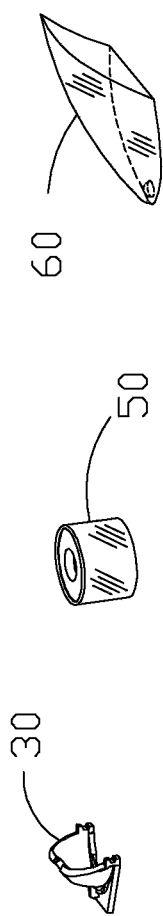
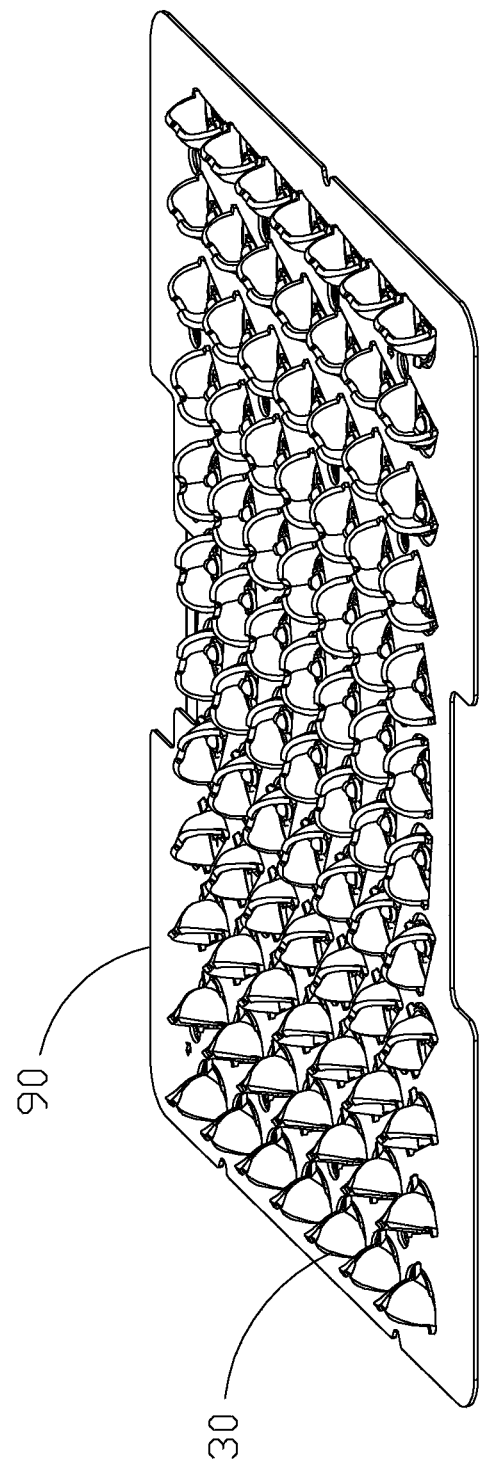

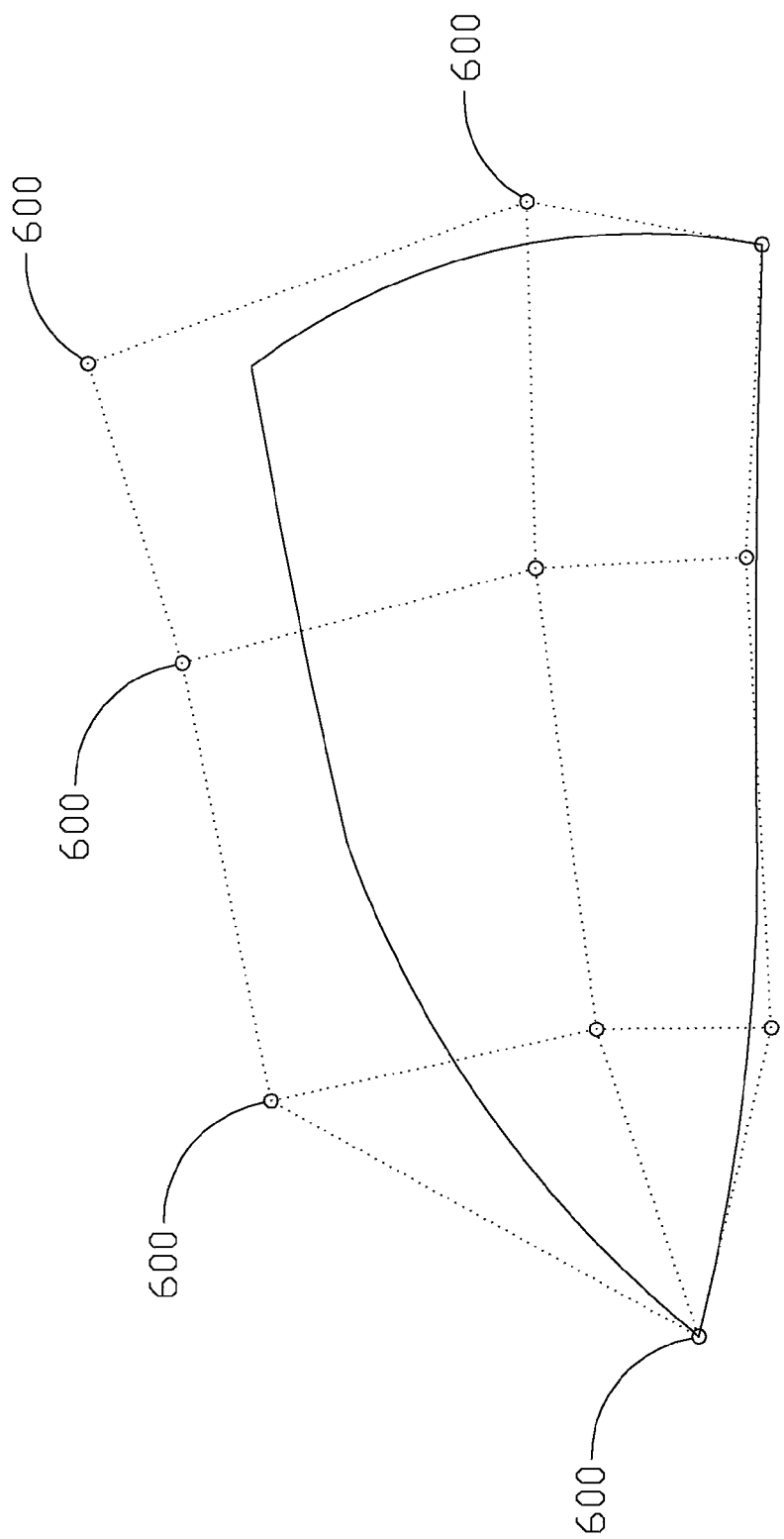

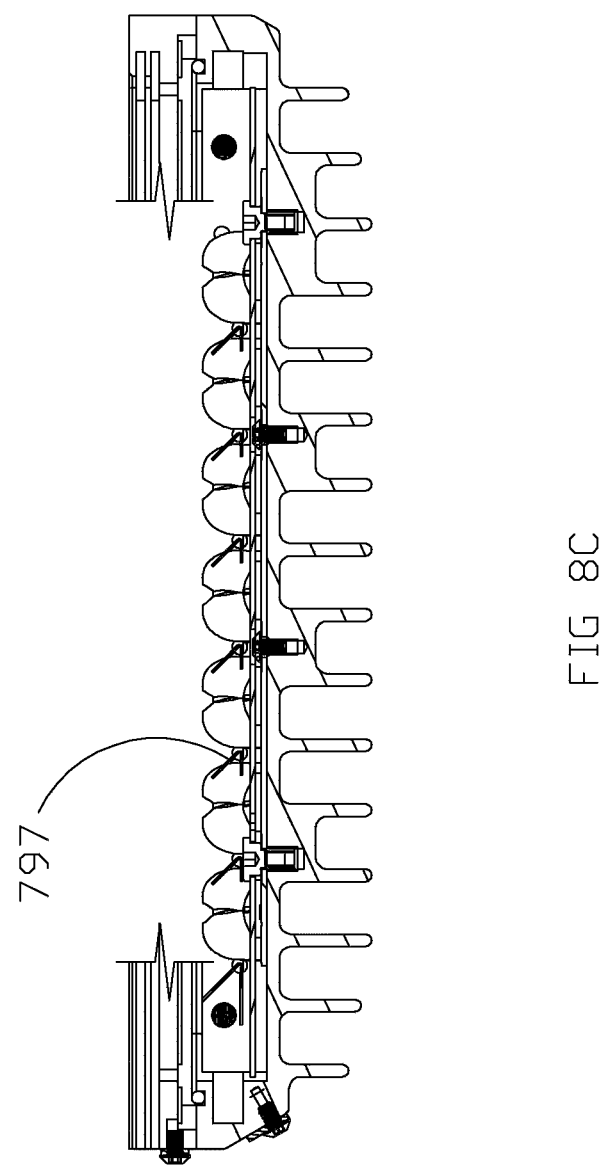

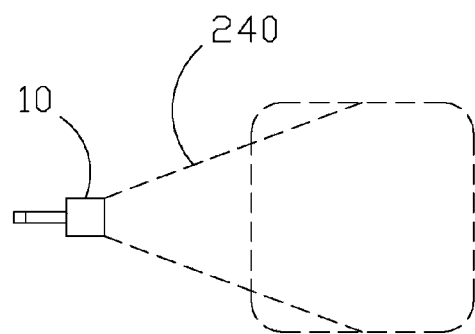
FIG 12A
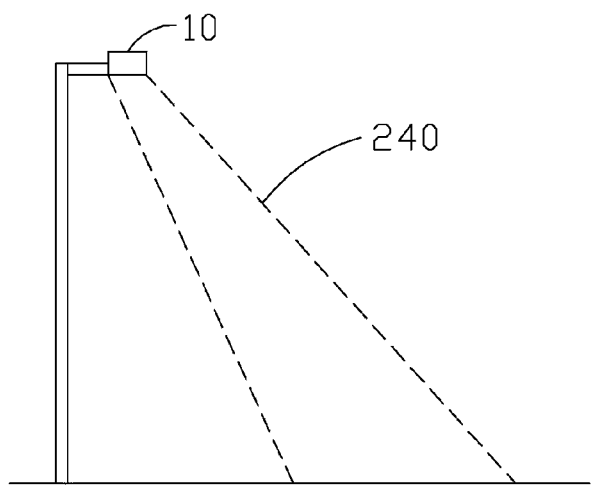 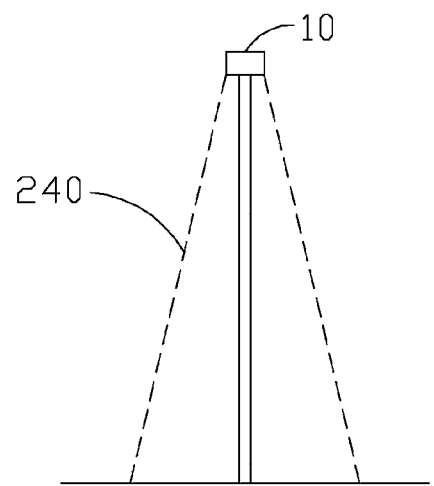
FIG 12B                FIG 12C

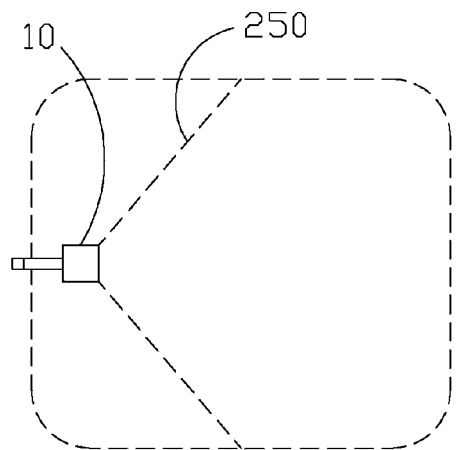
FIG 13A
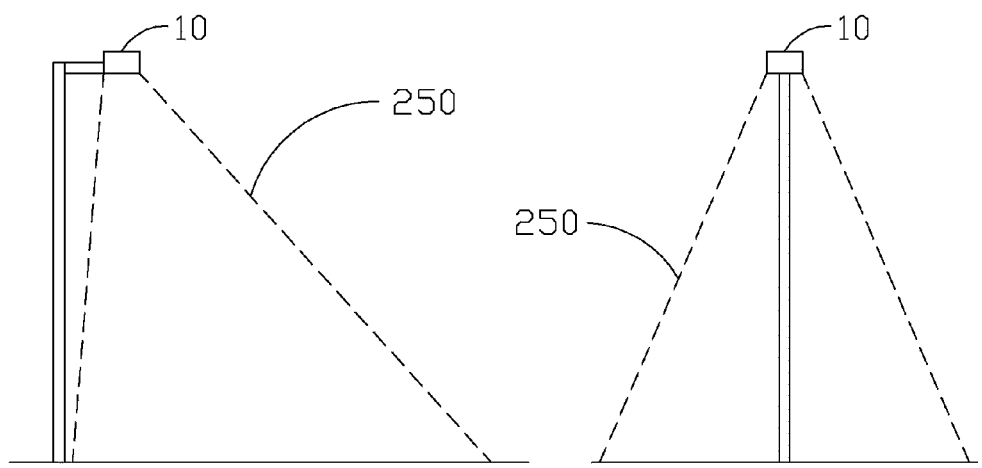
FIG 13B
FIG 13C

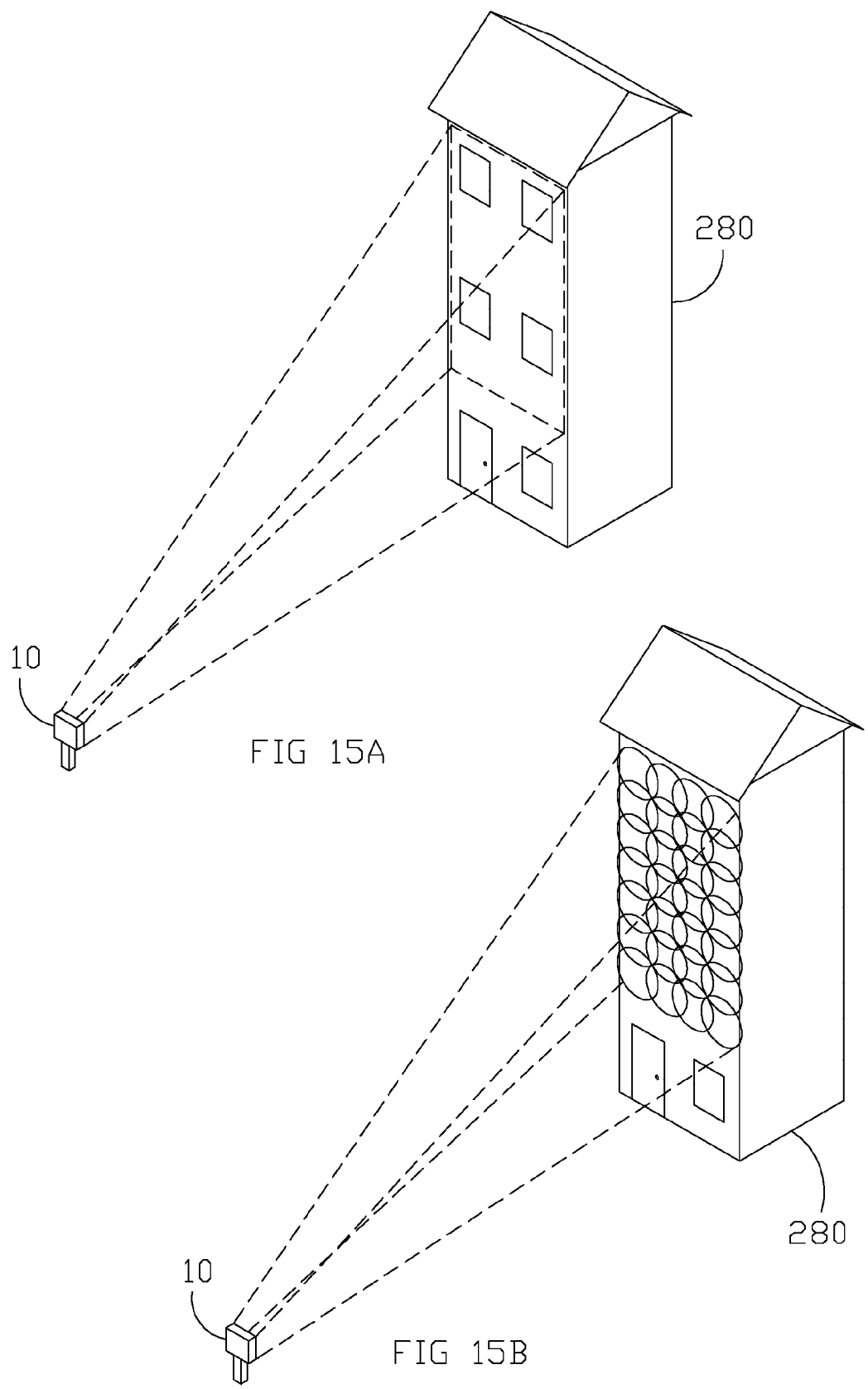

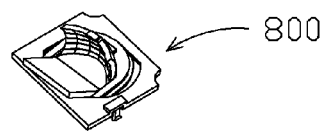
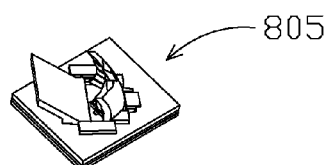
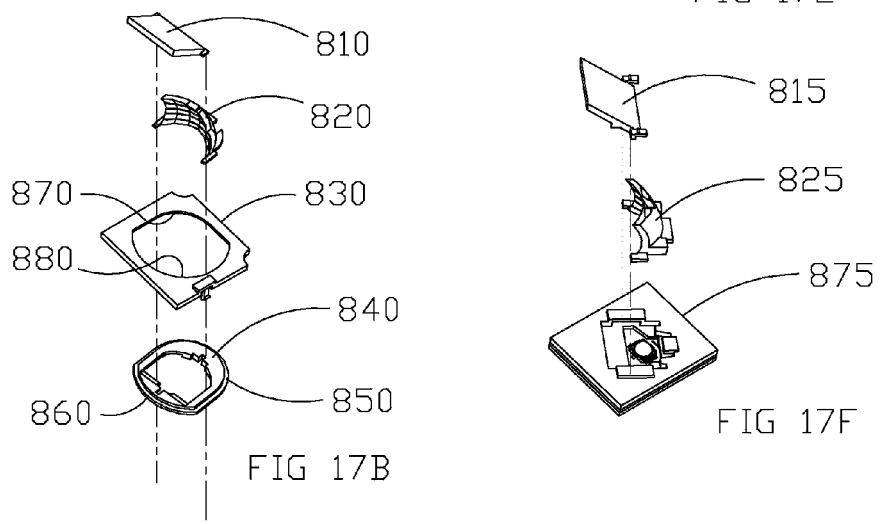
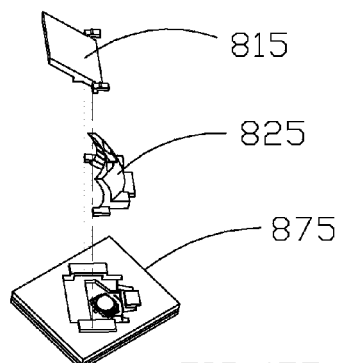
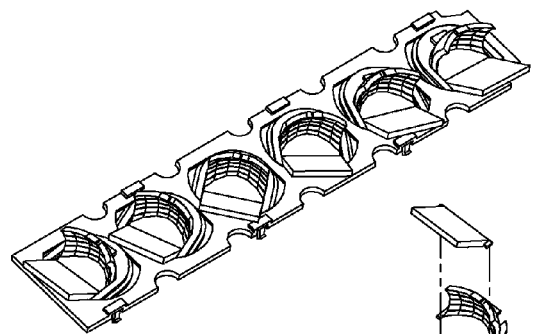
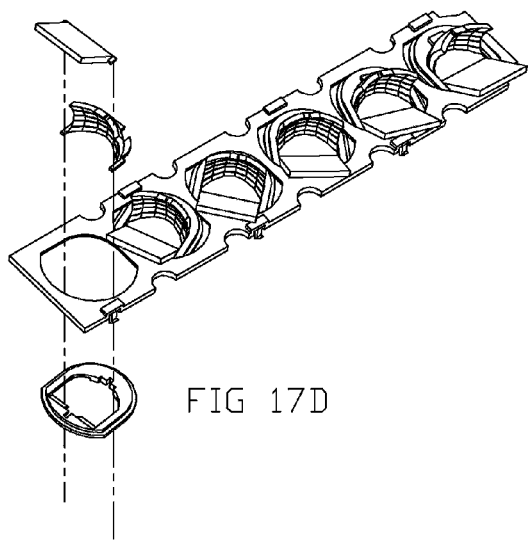

METHOD, SYSTEM, AND APPARATUS FOR HIGHLY CONTROLLED LIGHT DISTRIBUTION FROM LIGHT FIXTURE USING MULTIPLE LIGHT SOURCES (LEDS)

CROSS-REFERENCE TO RELATED APPLICATIONS

This application is a continuation-in-part of PCT application No. PCT/US09/57090 filed Sep. 16, 2009 which claims priority to U.S. Ser. No. 61/097,483 filed Sep. 16, 2008, both of which are hereby incorporated by reference in their entireties. This application is also a continuation-in-part of co-pending U.S. Ser. No. 12/467,160 filed May 15, 2009, now U.S. Pat. No. 8,356,916 issued Jan. 22, 2013, which claims benefit of U.S. Ser. No. 61/097,483 filed Sep. 16, 2008 and U.S. Ser. No. 61/054,089 filed May 16, 2008.

I. BACKGROUND OF THE INVENTION

Embodiments of the present invention generally relate to systems and methods for lighting. In particular, embodiments of the present invention relate to systems, methods, and apparatus for highly controlled light distribution from a light fixture using multiple light sources, such as light emitting diodes (LEDs).

Existing high intensity discharge (HID) fixtures use single large light sources which provide light beams which may be controlled somewhat by varying reflector design and mounting orientation. Typical LED fixtures having multiple small light sources function similarly. Each small light source has an optic (reflective or refractive lens) which creates a particular beam pattern. The beams from each LED are identical in size, shape, and cover the same area (the offset of a few inches based on position within the fixture is insignificant given the size of the beam as projected). This means that the beam from the fixture comprising a plurality of LEDs is simply a brighter version of a beam from a single LED.

This approach requires that the optic being used with the LED be designed to produce the final shape of the luminaire output (see, for example, a type II distribution as defined by the Illuminating Engineering Society (IES)) when combined with the LED. The disadvantage of this approach is that the designed optic may only be used for one type of distribution and requires separate development, tooling, and inventory control for each optic and beam type. An example of these types of fixtures are the LED fixtures produced by BetaLED (available from Beta Lighting Inc., Sturtevant, Wis., U.S.A.) which use an array of identical NANOPTIC™ lens which are designed for each different type of beam desired.

Thus, these and similar fixtures may be improved with regard to controlling the distribution and intensity of the beam to facilitate shaping of the luminaire output. Such distribution control may further facilitate mitigation of undesirable lighting effects (e.g., glare, spill light, etc.). A light fixture which produces a beam pattern that is more easily varied and controlled is therefore useful and desirable in the lighting industry.

II. SUMMARY OF THE INVENTION

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention are described with reference to LEDs, LED lighting, etc., however, embodiments of the present invention are equally applicable to various other solid-state light sources, other lighting devices (such as e.g., lasers), or fixtures that allow for multiple light sources to be packaged together in a small area.

For purposes of structural description it is convenient to describe the embodiments wherein the LEDs are facing up. For purposes of description of the composite beam output, it is convenient to describe the apparatus wherein the LEDs are facing down. Descriptions in terms of directional orientation is not intended to preclude mounting in any other orientation as desired.

It is therefore a principle object, feature, advantage, or aspect of the present invention to improve over the state of the art and/or solve problems and deficiencies in the state of the art.

Further objects, features, advantages, or aspects of the present invention include a method for creating a system of light distribution to provide lighting of a specified illumination level to a predetermined area. Said lighting may include standard beam shapes well known in the art of lighting such as IES/National Electrical Manufacturers Association (NEMA) beam types, as well as individually customized beam shapes including shapes having uneven light distribution with added or subtracted amounts of light in small areas which may be on the order of one meter square. One example is illustrated in FIG. 2A in which a composite beam 200 may be comprised of light beams 210 from a single fixture 10; note only a few light beams 210 are illustrated in FIG. 2A and are not representative of the number of light beams produced from fixture 10. Alternatively, as illustrated in FIG. 2B, a composite beam 220 may be formed from light beams 210 from multiple fixtures 10 that are part of a collective group; again, for purposes of demonstration and brevity, only a few beams 210 are illustrated.

Further objects, features, advantages, or aspects of the present invention include the ability to provide illumination of the desired shape, size, and intensity to target areas of a predetermined specification (e.g. corners, walkways, building surfaces, etc.), as well as areas in proximity to "low light zones" (e.g., residences, parks, etc.) using relatively high intensity (high candela produced), high efficacy (high lumens/watt) light sources. Other advantages include the ability to provide an even illumination of a target area that avoids harsh spots (i.e., overly bright spots), shadows, glare, and other undesirable effects.

Further objects, features, advantages, or aspects of the present invention include an apparatus, method, or system of optical units comprising a plurality of light sources, such as one or more LEDs, each source having an associated optic which is individually positionable. In at least some embodiments of the present invention, one or more optics are developed that allow for lighting different target areas in an effective manner by rotating or otherwise positioning the optics to create a composite beam. Associated optics may include reflectors, refractive lenses, total internal reflection (TIR) lenses, or other lens types. Which type of associated optic used may be based on applicability to a particular use such as emission angle from the fixture, manufacturing costs, and/or other preferences.

Further objects, features, advantages, or aspects of the present invention include an apparatus, method, or system of lighting which makes it possible to widely vary the types of beams from an available fixture using a small number of optics and fixtures, thereby potentially reducing fixture cost, reducing lead time for custom lighting, and multiplying the versatility of any new fixtures or optics which may be created. In some cases, by using a combination of individual beam patterns, a small set of individual optics (e.g., on the order of 10) may be sufficient to create a majority of the typical and specialized composite beams needed to meet the needs of most lighting projects and target areas.

1. Apparatus

At least some embodiments of the present invention provide for an apparatus comprising a lighting fixture with a plurality of individual light sources. The plurality of individual light sources may include solid-state light sources (such as LEDs). Each light source may include its own optic with elements such as reflectors, refractive lenses, light blocking tabs, and/or other elements. Each individual optic, according to at least some embodiments of the present invention, is part of an array of optics placed in a specific location relative to the fixture and/or the other light sources. This array may be an arrangement of rows, a circular, radial, spiral pattern; or any other pattern or shape. The individual optics may be mounted in the fixture to facilitate adjustment in one or more directions relative to the light sources so as to vary the location of each individual beam within the composite beam. Adjustment of the optics may be preset by the manufacturing or assembly process, or the fixture may be manufactured such that the rotational position of individual optics may be set at installation or at a later time. This may allow, for example, a local inventory of individual fixtures that may be very quickly configured for given applications.

While traditional LED fixtures commonly mount the LEDs with snap-fit components and/or adhesives, these mounting techniques may lead to loss of position or alignment, or fixture failure within a short period of time relative to desired lifetime of area lighting fixtures. The envisioned mounting/adjustment method and apparatus may provide improvements in the art.

According to at least some embodiments of the present invention, the fixture may include LEDs mounted on a substrate that may be a circuit board of laminated or layered thermally conductive material, standard circuit board materials, and/or other materials that provide dimensional stability, facilitating the affixing of necessary circuitry, and optional benefits for thermal management.

In at least some embodiments of the present invention, the fixture may optionally include elements to further direct or control the individual beams such as tabs (e.g., see reference no. 35, FIG. 9) or analogous devices which may be affixed relative to one or more individual light sources and placed in such a way as to restrict direct, non-reflected or non-controlled light or similarly to restrict light emitted at an angle which is not desired for the particular application.

2. System

At least some embodiments of the present invention provide for a system that uses a plurality of fixtures or fixture groups placed at various spaced-apart locations within or around an area to be lighted. Further, at least some embodiments of the present invention may use one or more groups with one or more fixtures per group to provide a desired level of illumination within a target area of a predetermined specification in order to provide coordinated benefits of the above lighting method for areas such as sports fields, parking lots, buildings, etc. Still further, at least some embodiments of the present invention may use one more groups of one type of light source (e.g., LEDs) with one or more other groups of one type of light source (e.g., HID) to provide a desired level of illumination within a target area.

3. Method of Designing a Lighting System

According to at least some embodiments of the present invention, designing the lighting system may require steps including analyzing the intended application, selecting individual optics, and designing the composite beam; other steps are possible, and envisioned. These steps may be repeated as necessary to optimize the design and are discussed in further detail in the accompanying specification; creation of a composite beam is presently discussed.

a. Creating a Composite Beam

In one aspect, a composite beam comprises the light beam from each optic (i.e., the beam produced by light emitted from a light source and directed by an optic), each of which produce a portion of the overall beam pattern. Each beam portion may be the primary or essentially the only light source for a certain portion of the target area; alternatively, by combining a set of optics that project various beam types (for instance circular, elongated, or oblong beams), a series of individual beams may overlapped to built a desired pattern (e.g., FIG. 3D) at a desired level of illumination, which may help to compensate for illumination lost due to distance (inverse square law) or incident angle (cosine law) or for other factors. For example, more individual beams may be directed towards the farther edges of the composite beam (e.g., see the overlapping of reference no. 400, FIG. 3B), or different beam patterns (e.g. circular, elongated, narrow, wide, etc.) having different intensities may be created such that distribution in the target area is even (e.g., many more intense ten-degree circular beams may be used for illuminating the area farthest from the fixture, while fewer less intense twenty-degree beams may be used closer to the fixture). The beam edges of one beam may overlap an adjoining beam at any desired degree to provide uniform distribution or an entire individual beam may overlap another individual beam to increase the intensity, and the composite beam may be composed of a combination of a number of individual beams of different sizes, shapes, distribution angles, and orientations (e.g., subject only to available lens design, an oblong beam (see reference no. 403, FIG. 4) may be oriented axially with the beam, transverse to the beam, or at some other angular orientation relative to the beam axis). The result may be a beam distribution in a rectangle, oblong, oval, circle, fan, or other shape as desired as illustrated in FIGS. 3A-3E.

In accordance with at least some embodiments, as may be used on a sports field, such a composite beam may provide illumination at, for example, the base of the light fixture mounting pole as well as to distant areas on a field. Additionally, in at least some of the embodiments of the present invention the beam may be cut off at the edge of a field (e.g., see the beam pattern illustrated in FIG. 3C) while still providing adequate illumination close to the edge of the field. Examples of shapes which may be easily adapted to illuminate, for example, the corner of a field (e.g., FIG. 3E), a football field (e.g., FIG. 3D), a short and wide building 270 (see FIGS. 14A-C), a tall and narrow building 280 (see FIGS. 15A-15B), as well as many other specific shapes and configurations, are discussed.

4. Pixelation

Unlike conventional lighting fixtures, at least some of the embodiments of the present invention may provide granular (also referred to as pixelated) control of light at a high level of precision wherein for a given application, small areas, which may be on the order of 1 square meter (according to lens design, mounting height, fixture mounting angle, etc.), may have brightness somewhat controlled. This allows areas within the target area to be emphasized. For buildings, signs, or other applications where a sharply defined shape is to be illuminated, these embodiments provide greater flexibility than conventional lighting.

As an example, an HID lamp producing 36,000 lumens may cover approximately 180 m² (an area 12 m×15 m) at 200 lux (lumens/m²). At least some embodiments of the present invention provide for a fixture that includes multiple LEDs that may cover the same 180 m² area; in one example, each LED is capable of producing 200 lumens for one square meter (i.e., 200 lux). As the individual beam from each LED is adjustable using the aforementioned methods, this provides a level of precise control that provides in effect a "pixel-by-pixel" control of illumination on a target area, which both conventional HID and conventional LED lighting cannot do. Both conventional HID and conventional LED fixtures are limited to the beam pattern as projected from the fixture, with minor modification possible by use of methods which may only affect the whole beam or a large portion of the beam.

As another example, an HID lamp producing 36,000 lumens over a 180 m² area may adequately illuminate that area to 200 lux, but if the target area is, for example, 208 m² area (an area 13 m×16 m), portions of the target area are inadequately illuminated. One option is to increase the lumen output of the existing HID lamp, which may not be possible or may significantly reduce the life of the lamp. Another option is to add an additional HID lamp to supplement illumination efforts of the first HID lamp, which may be costly and result in harsh spots on the target area. Rather, if the HID lamp is supplemented with some number of LEDs precisely controlled using the aforementioned methods, light from the LEDs may be directed only where needed, resulting in a more uniform illumination level over the entire target area (when compared to an all-HID system) at a reduced cost (when compared to an all-LED system).

5. Additional Optional Elements

An embodiment that uses reflective-type lenses may not work well if a flat plate glass cover (e.g., see reference 40, FIG. 1B) was required for the fixture and the fixture needed to be oriented more or less parallel to the ground, since some beam patterns may require a high angle of incidence. The result may be that the light may be reflected by the surface of the cover rather than transmitted through the cover. In this case, it may be more effective to use the refractive lens design or to change the cover design. Use of anti-reflective coatings for covers is well known in the art, with theoretical allowable angles of incidence up to 60 degrees from normal, which may increase usability of refractive lenses at higher angles. However, their use is generally limited to about 45 degrees from normal, which may make the use of refractive lens arrays rather than reflective arrays more effective under some circumstances.

Optional additional elements may include an additional lens or lenses or other optical element in association with the fixture which may contribute to the overall lighting effect or may provide other benefits such as enhanced aesthetics, protection of the components of the fixture, or reducing any unpleasant visual effects of directly viewing the fixture (e.g., glare).

A fixture using an array of LEDs may allow light at an angle which is relatively controlled and that may be acceptable for some applications but may still benefit from additional control. Using a single visor of a type which is common to existing lighting fixtures may tend to either completely block the light emitted from the lights near the front of the fixture (e.g., see reference no. 790, FIG. 7B) or to have little or no effect on the angle of emission from the light sources near the rear of the fixture (e.g., see FIG. 7C). Multiple visors 797 as shown in FIG. 7D may provide an additional novel means of precisely controlling light from a fixture.

6. Aimability

Some embodiments of the present invention provide or enhance the ability to pre-aim a fixture at the factory or manufacturer relative to a particular location or application. The envisioned embodiments may be easily pre-aimed, since their placement of light on an area may be accurately established and indexed to the intended mounting positions of the fixtures. Additionally, the fixtures may be aimed precisely in the field by indexing from individually aimed lights/optics or from precision manufactured reference locations on the fixture.

III. BRIEF DESCRIPTION OF THE DRAWINGS

From time-to-time in this description reference will be taken to the drawings which are identified by Figure number and are summarized below.

FIG. 1C illustrates components of a fixture according to aspects of the present invention.

FIG. 1D illustrates a substructure or frame which provides orientation and indexing according to aspects of the present invention.

Figure 2A:
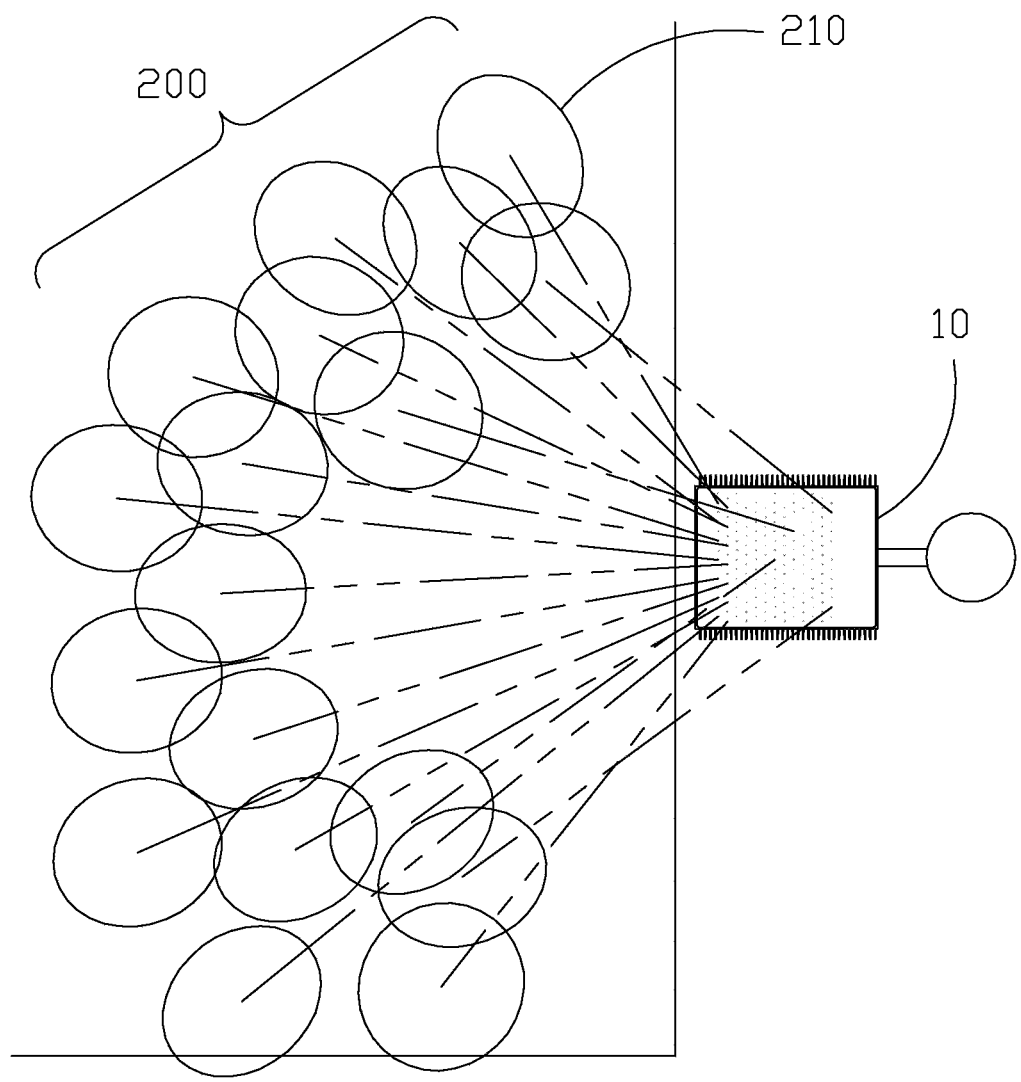
Figure 2B:
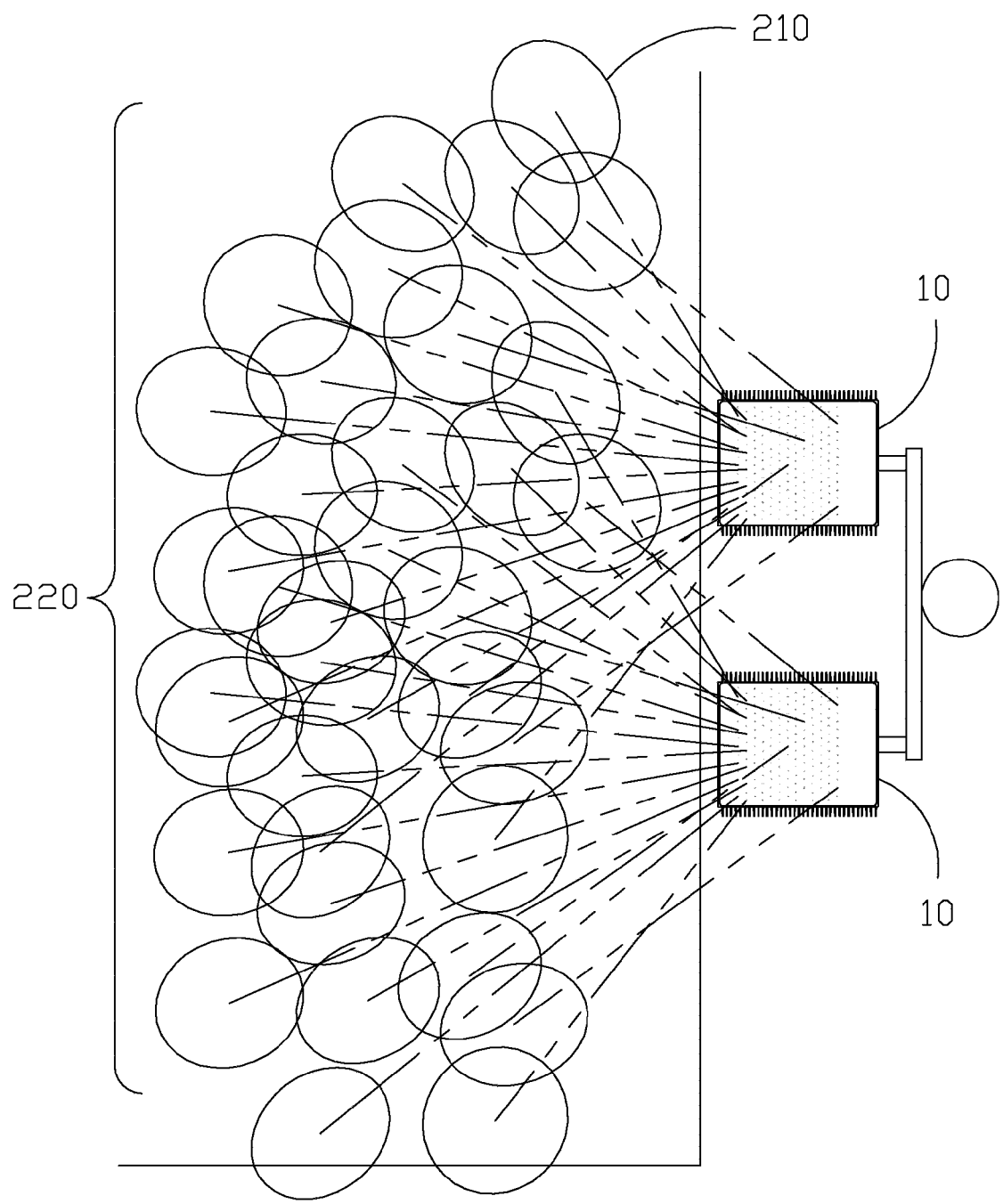

FIGS. 2A and 2B diagrammatically illustrate formation of a composite beam according to aspects of the present invention.

FIGS. 3A-3E illustrate potential composite beam layouts according to aspects of the present invention.

Figure 4:
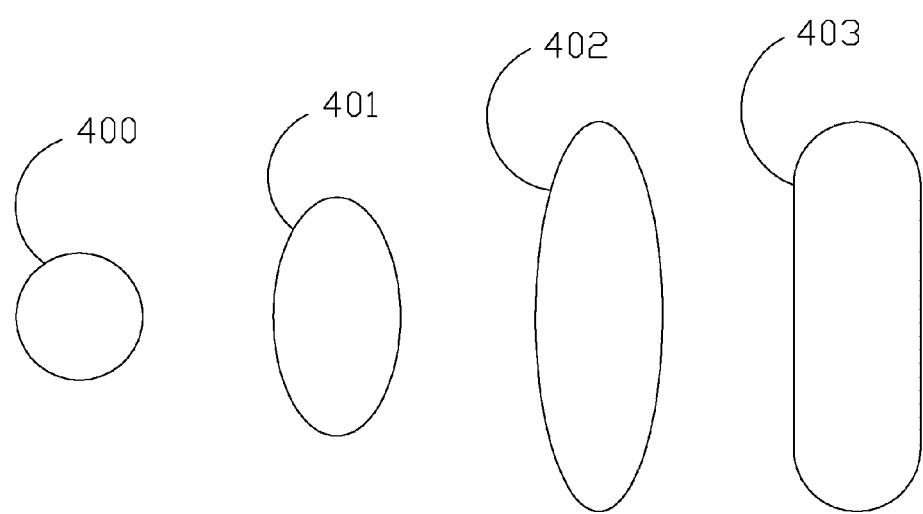

FIG. 4 illustrates examples of some beam shapes that may be created or used as sub-beams according to aspects of the present invention.

Figure 5:
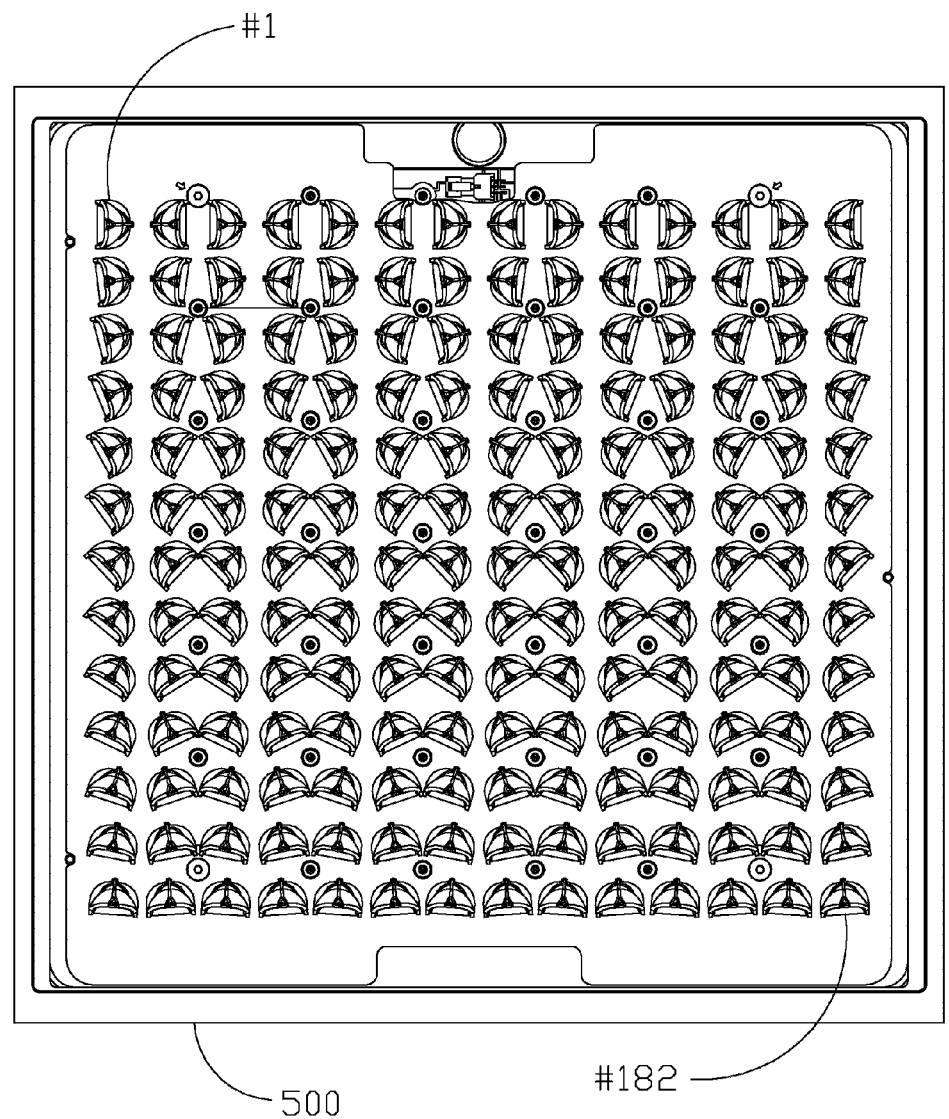

FIG. 5 illustrates aspects of an example fixture using reflector-type optics according to aspects of the present invention.

FIG. 6A illustrates Bezier controls used in the design of a reflective optic element according to embodiments of the present invention.

Figure 6B:
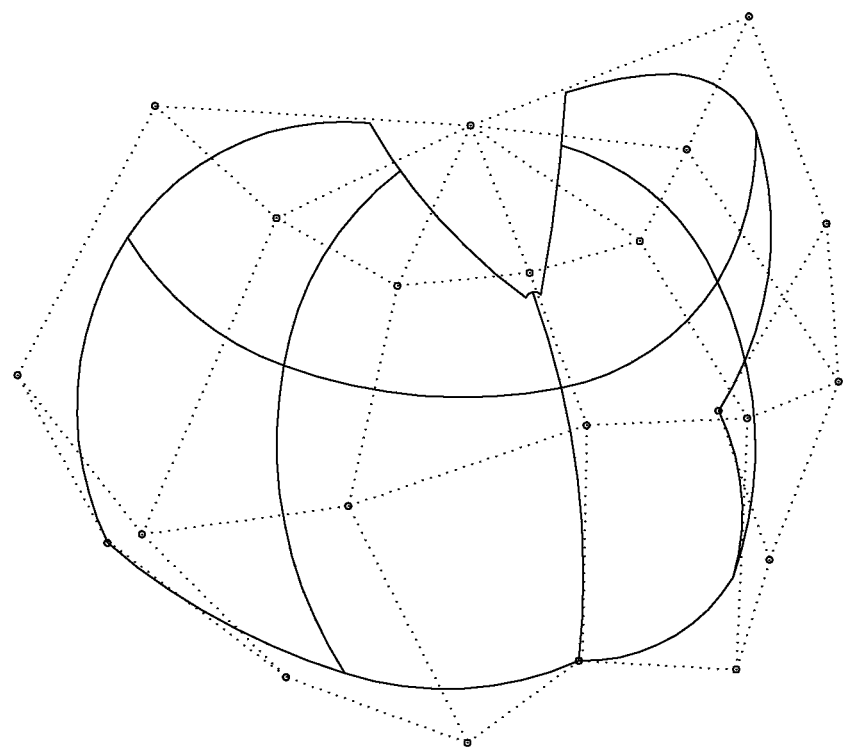

FIG. 6B is a graphical representation of an untrimmed image of an optic created according to aspects of the present invention.

Figure 6C:
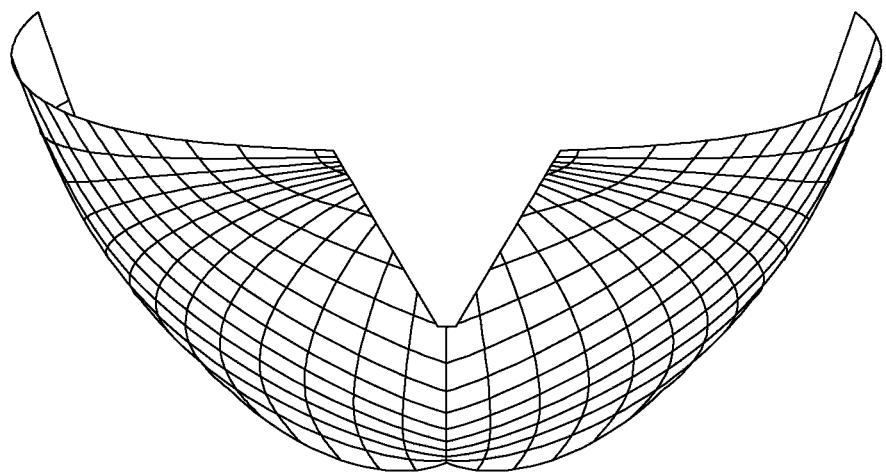

FIG. 6C is a graphical illustration of a trimmed image based on the trim line of an optic according to aspects of the present invention.

Figure 6D:
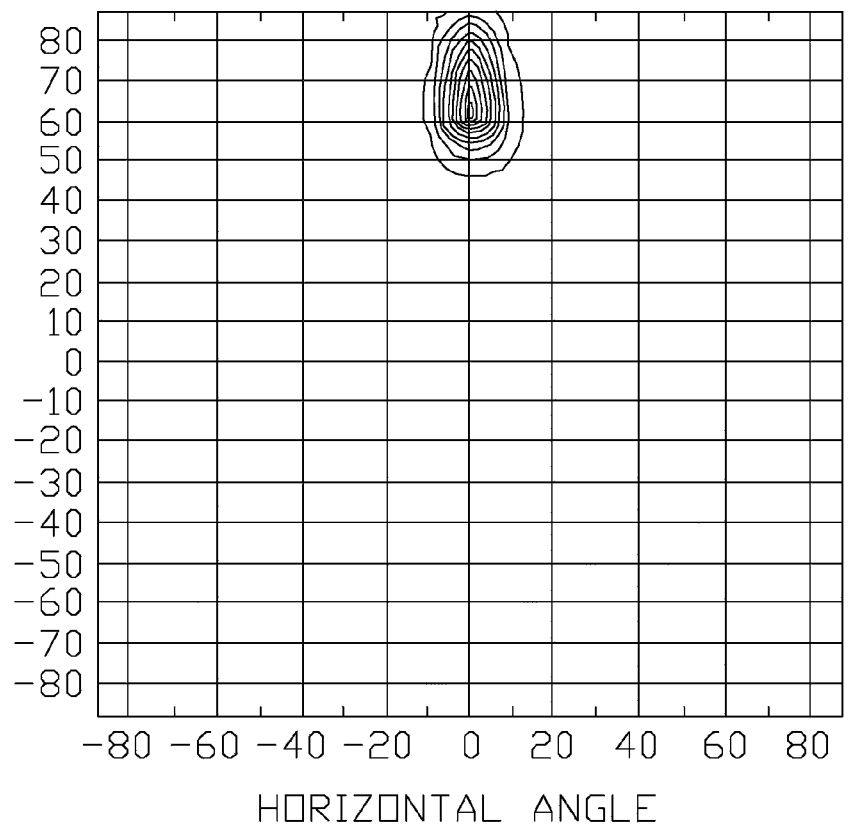

FIG. 6D illustrates isocandela traces based on a traditional parabolic reflective optic element.

Figure 6E:
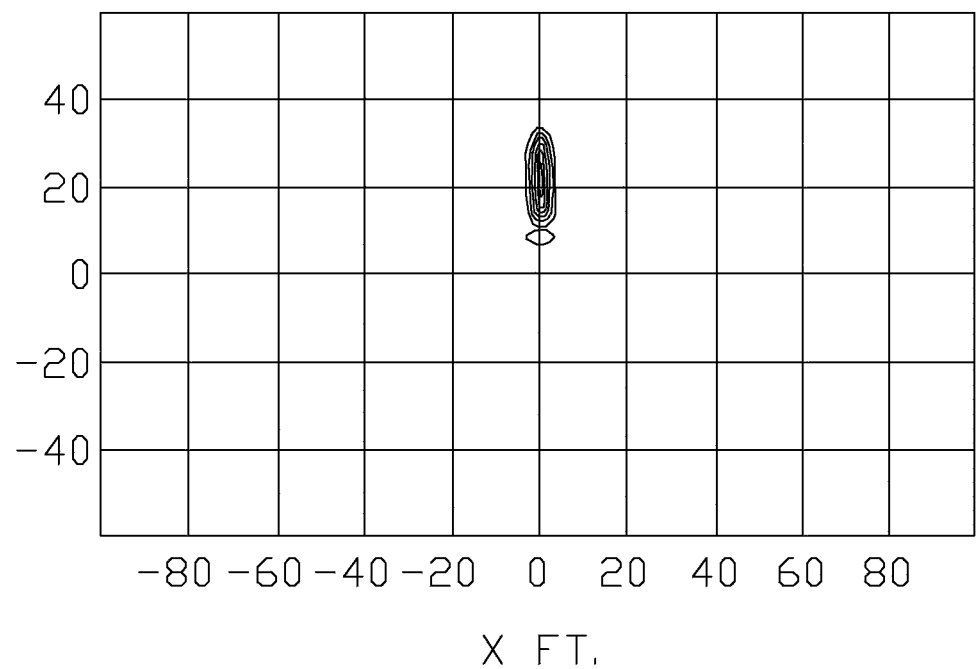

FIG. 6E illustrates foot-candle traces based on a traditional parabolic reflective optic element.

Figure 6F:
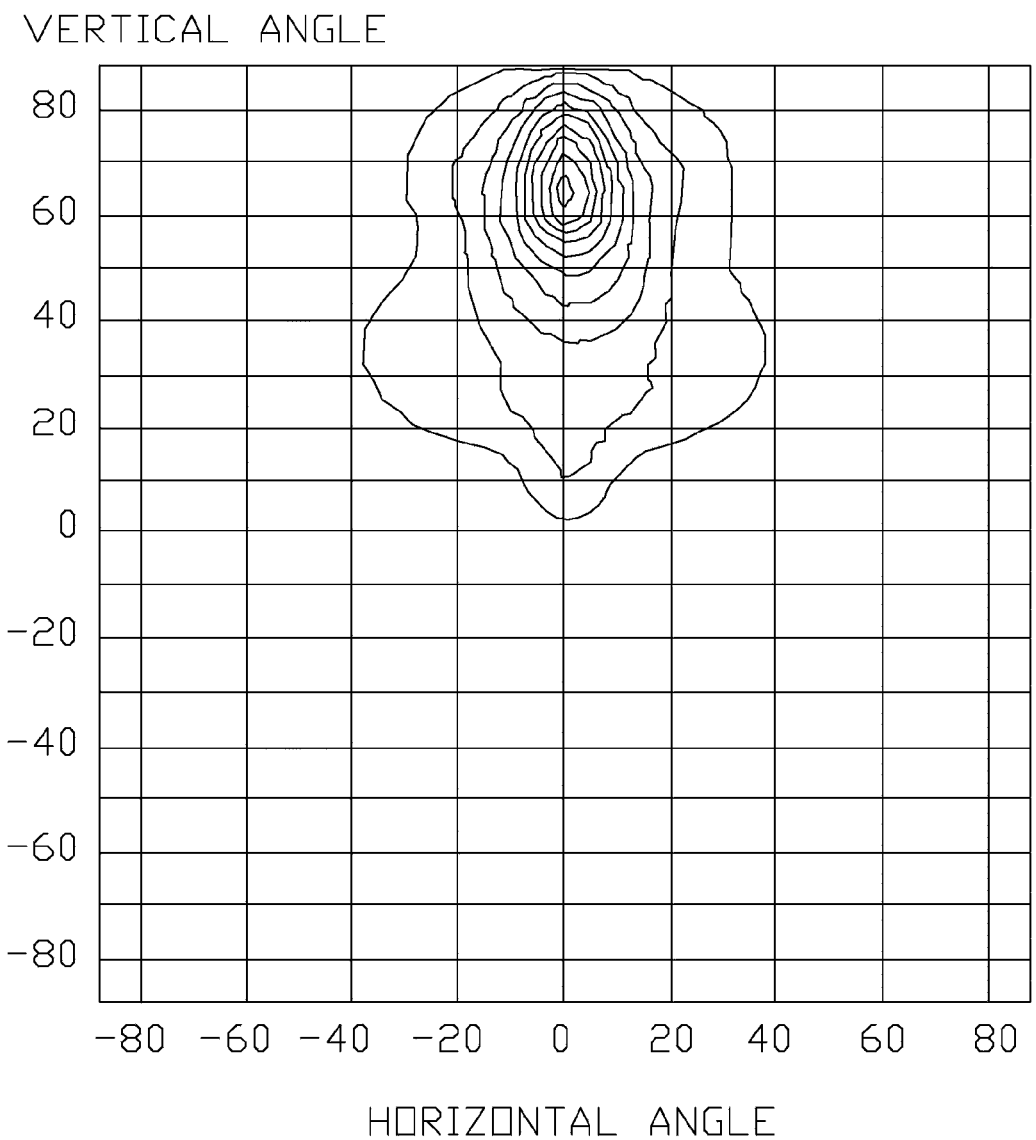

FIG. 6F illustrates isocandela traces based on a modified reflective optic element created according to aspects of the present invention.

Figure 6G:
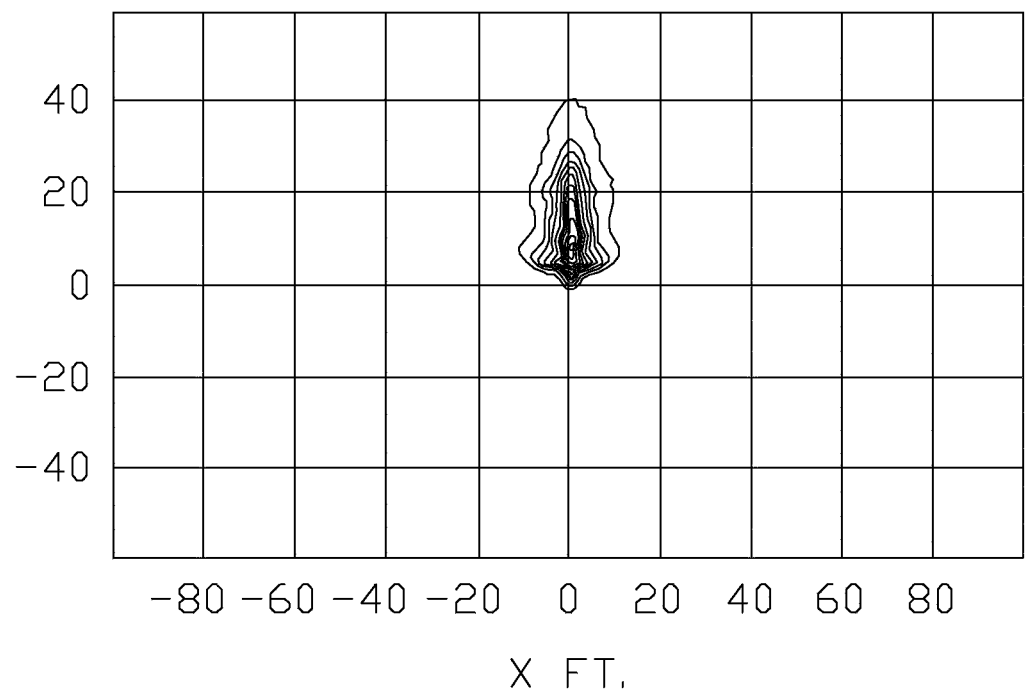

FIG. 6G illustrates foot-candle traces based on a modified reflective optic element created according to aspects of the present invention.

FIGS. 7A-7D diagrammatically illustrate application of a visor according to aspects of the present invention.

Figure 7A:
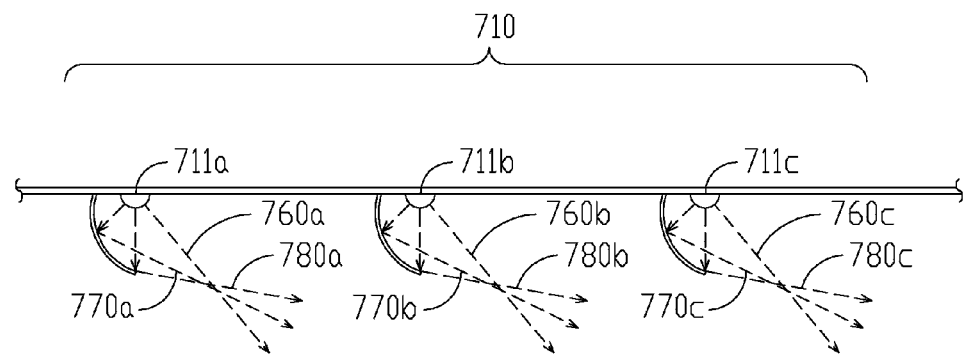
Figure 7B:
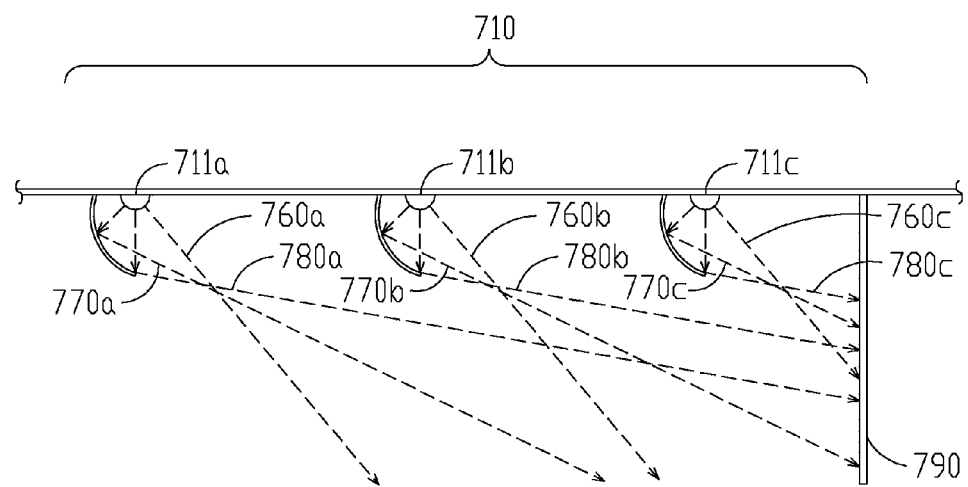
Figure 7C:
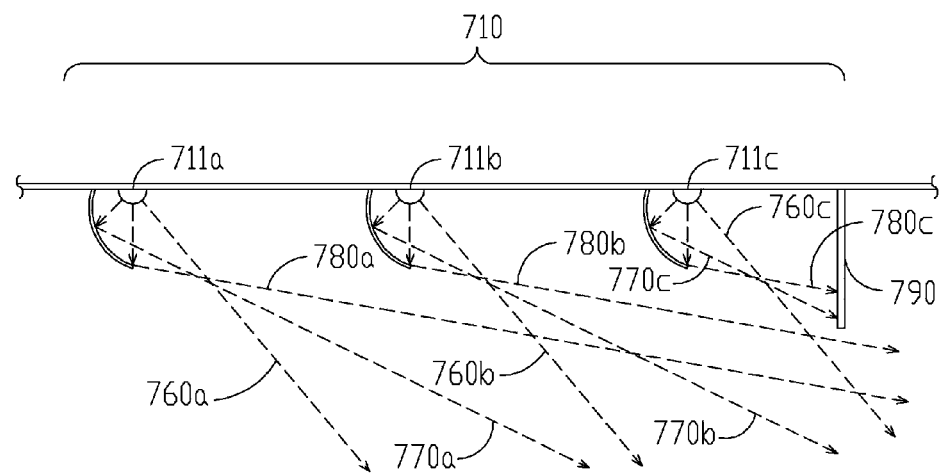
Figure 7D:
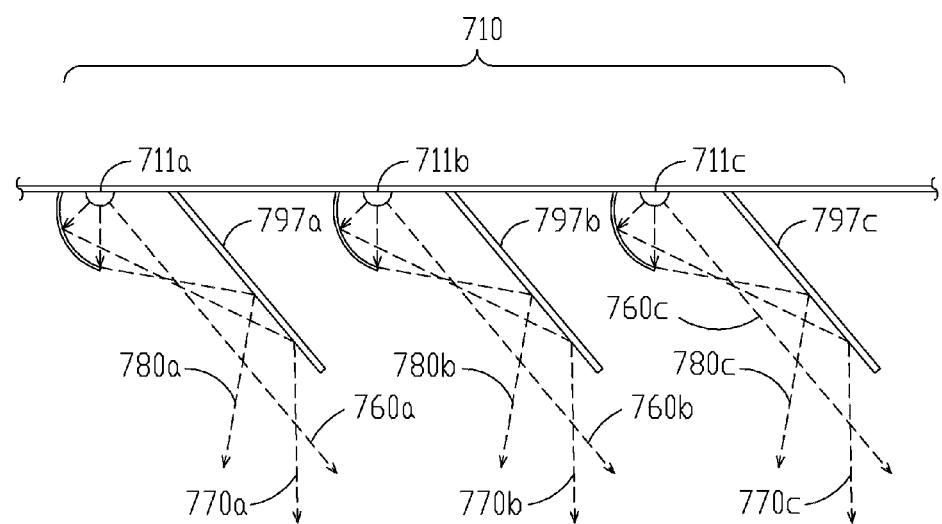
Figure 8A:
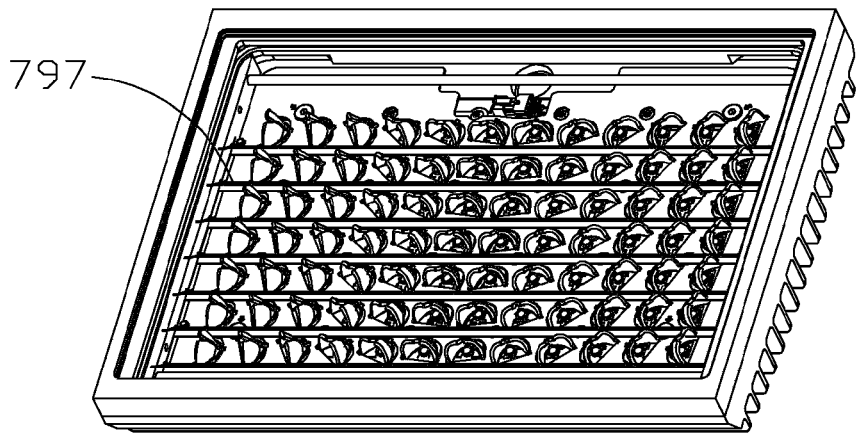
Figure 8B:
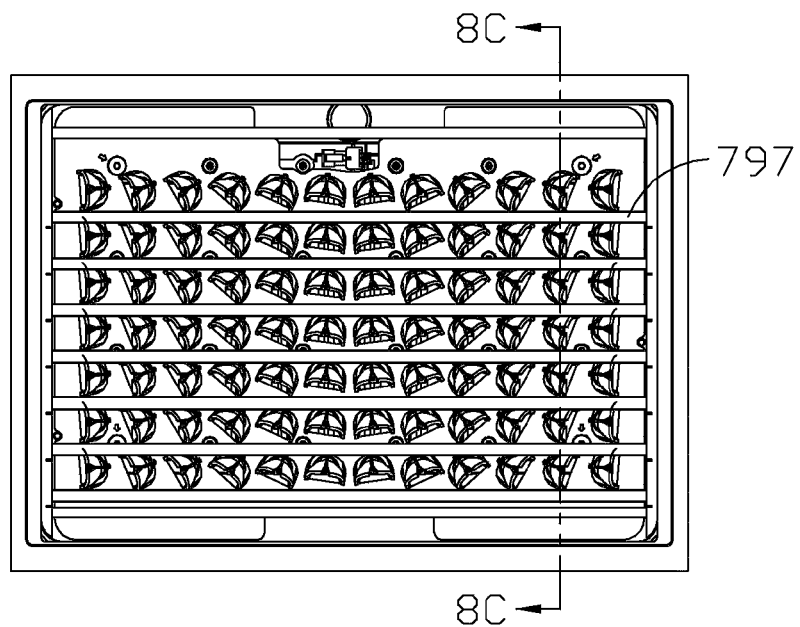

FIGS. 8A and 8B illustrate application of the visor of FIGS. 7A-D to arrays of LEDs according to aspects of the present invention.

FIG. 8C illustrates a view along line 8C-8C of FIG. 8B (with some lines removed) of a fixture having visors applied to arrays of LEDs according to aspects of the present invention.

Figure 9:
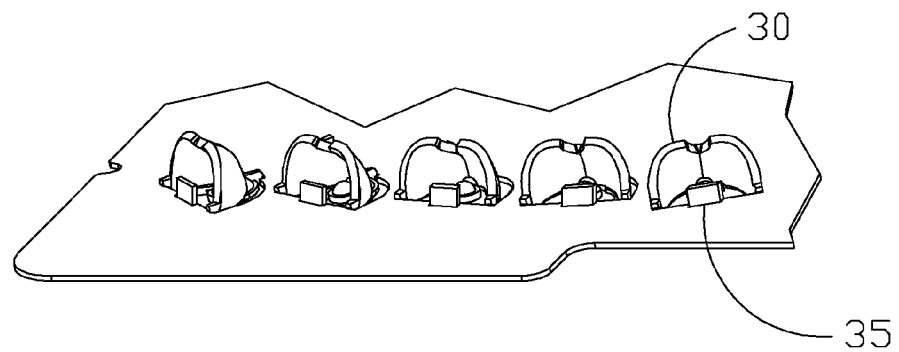

FIG. 9 illustrates an application of a reflective tab to an array of LEDs according to aspects of the present invention.

Figure 10:
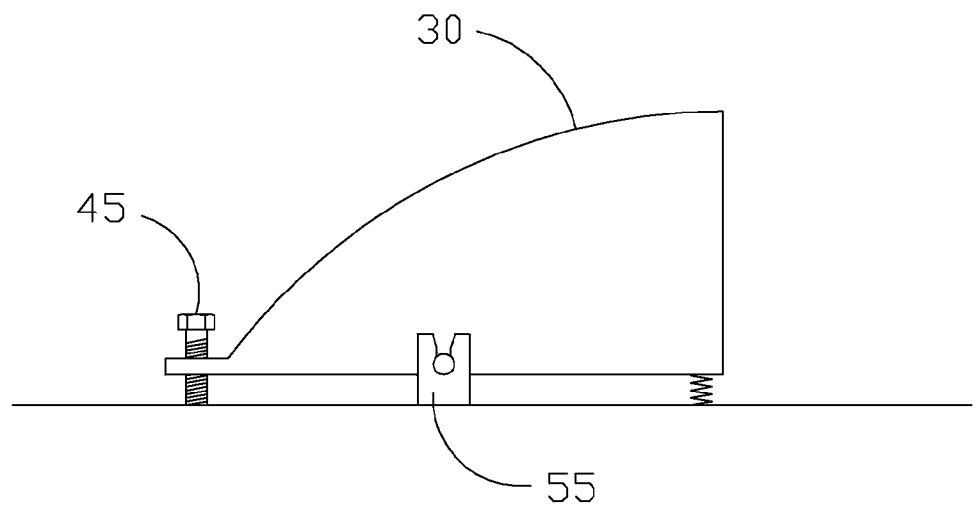

FIG. 10 illustrates a means of adjustment of an optic according to aspects of the present invention.

Figure 11A:
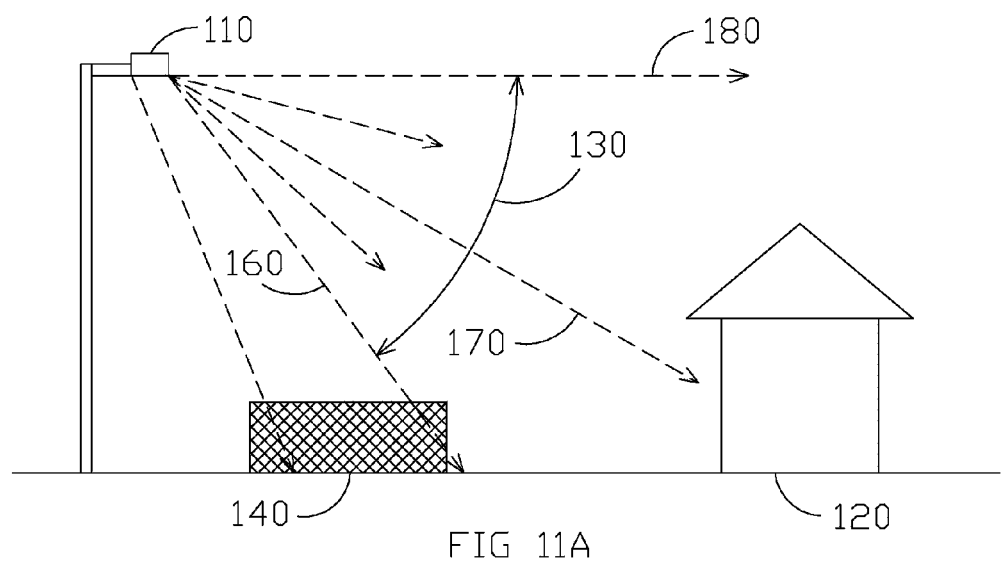
Figure 11B:
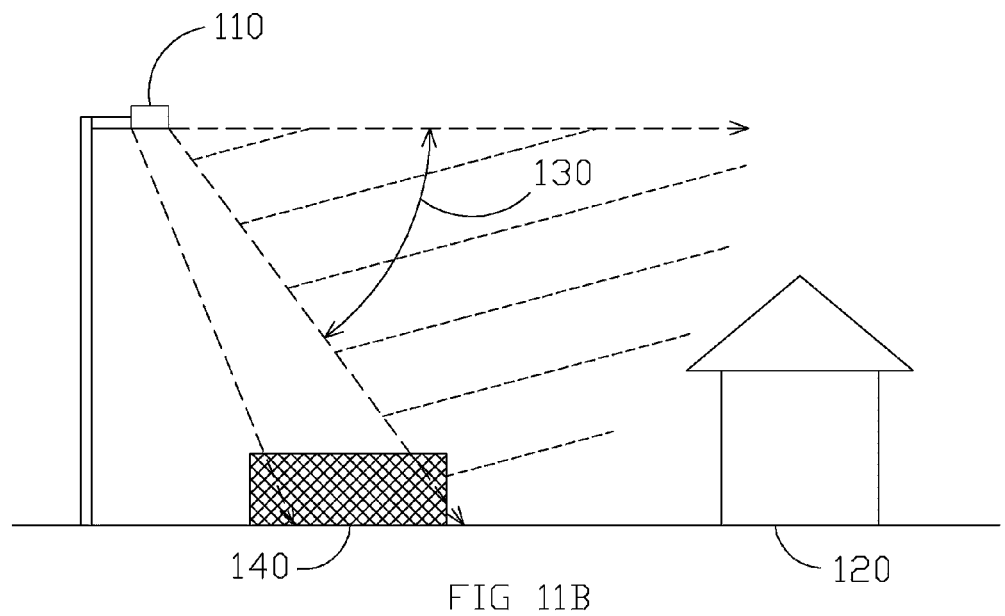

FIGS. 11A and 11B diagrammatically illustrate differences in the effect of lighting with and without control of spill light.

FIGS. 12A-C diagrammatically illustrate a composite beam with a relatively narrow beam and large incident angle according to aspects of the present invention.

FIGS. 13A-C diagrammatically illustrate a composite beam with a wide beam which projects light from a low to high range of incident angles according to aspects of the present invention.

Figure 14A:
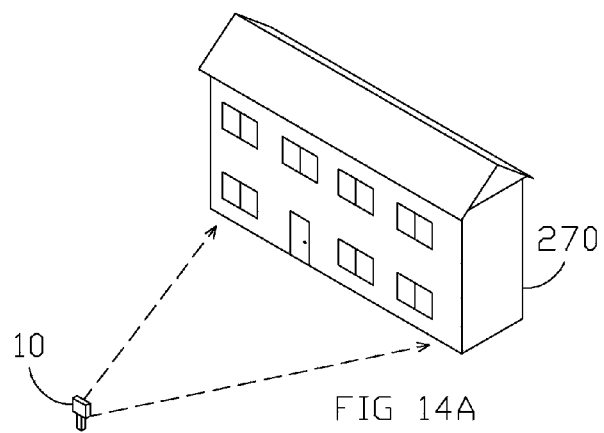
Figure 14B:
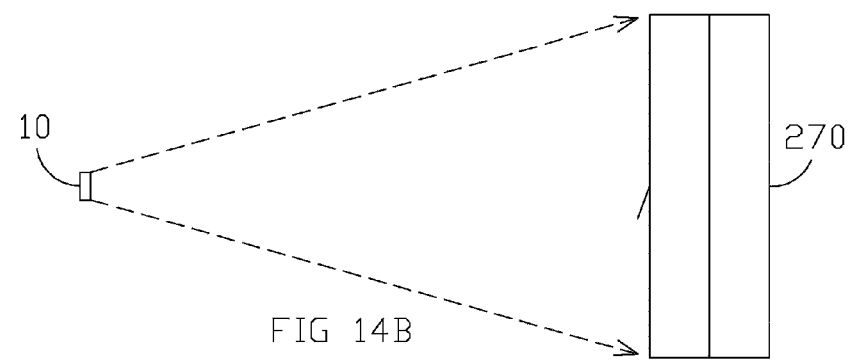
Figure 14C:
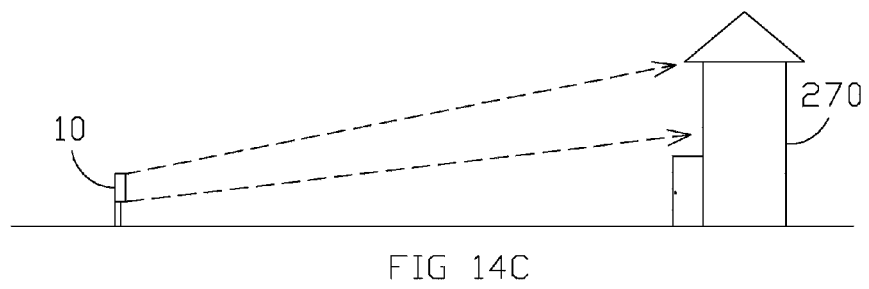

FIGS. 14A-C diagrammatically illustrate a building type that may be illuminated by a fixture in accordance with aspects of the present invention.

Figure 15C:
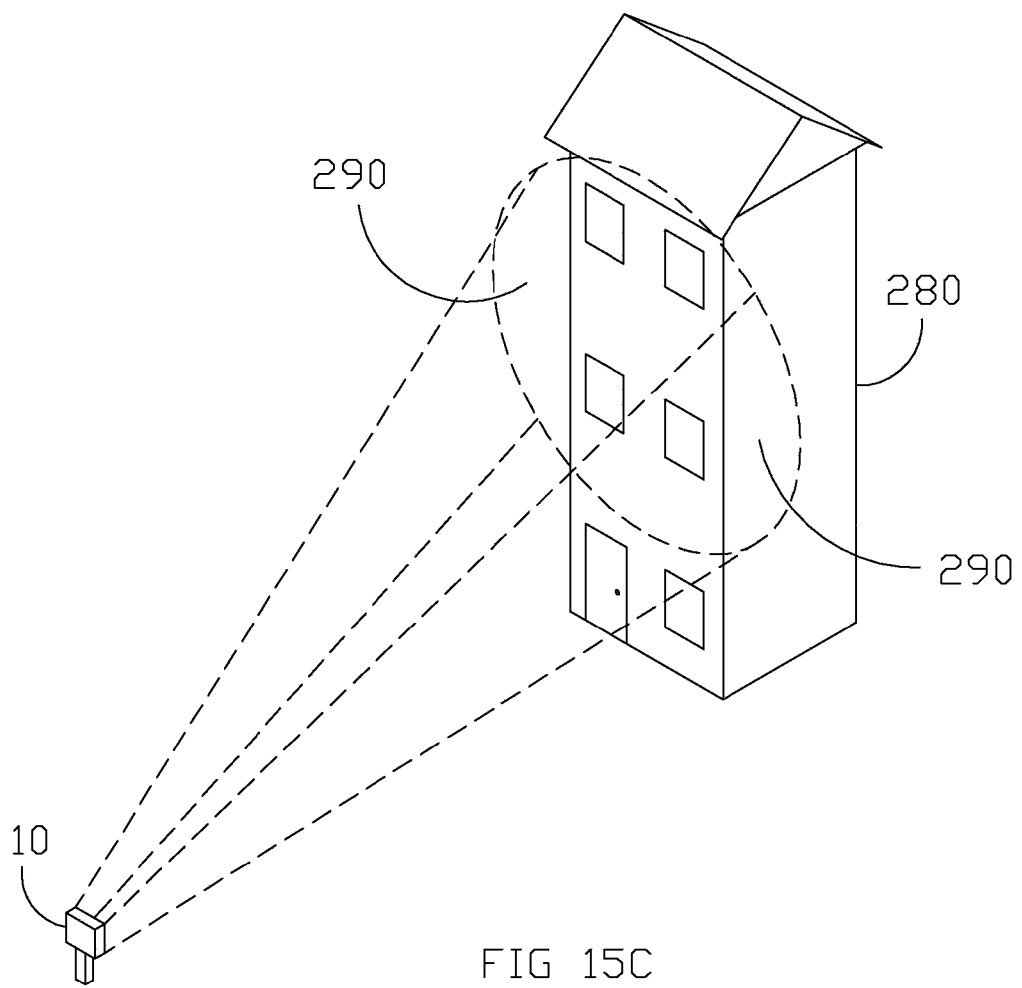

FIGS. 15A and B diagrammatically illustrate how a fixture, in accordance with aspects of the present invention, may provide precise illumination on the face of a tall, narrow building. For comparison, a conventional fixture with a conventional round beam on a tall, narrow building is shown in FIG. 15C.

FIGS. 16A-D diagrammatically illustrate how a beam that may be suitable for a wide building may be modified to be suitable for a narrow building.

FIGS. 17A-F illustrate optical combinations having individual visors according to aspects of the present invention.

Figure 18A:
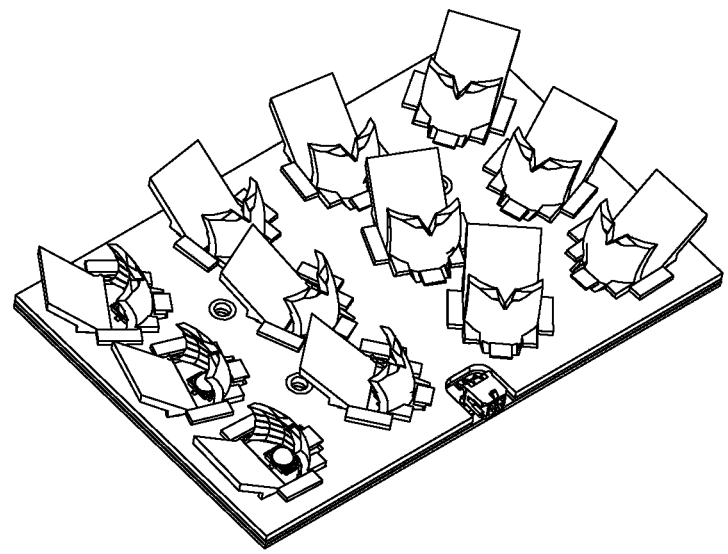
Figure 18B:
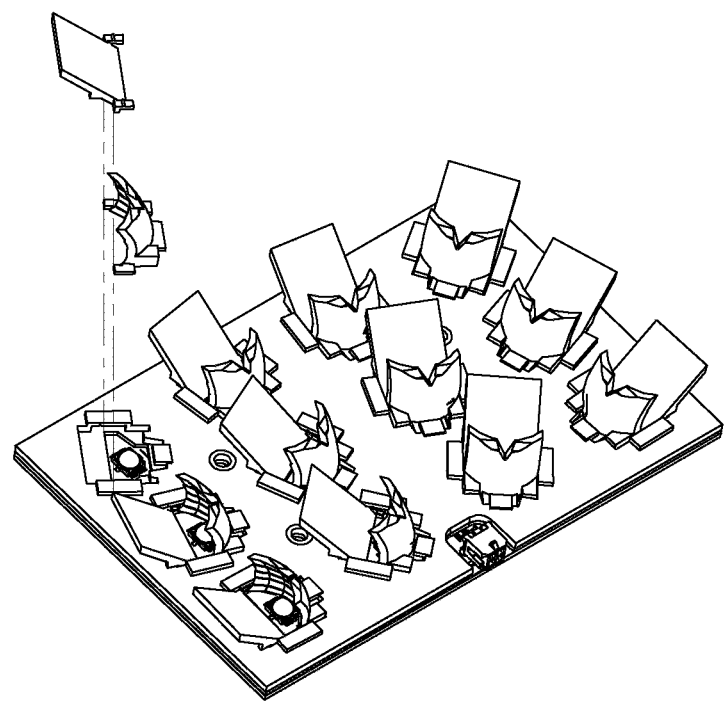

FIGS. 18A and 18B illustrate optical combinations which are oriented by their mounting plates according to aspects of the present invention.

Figure 19:
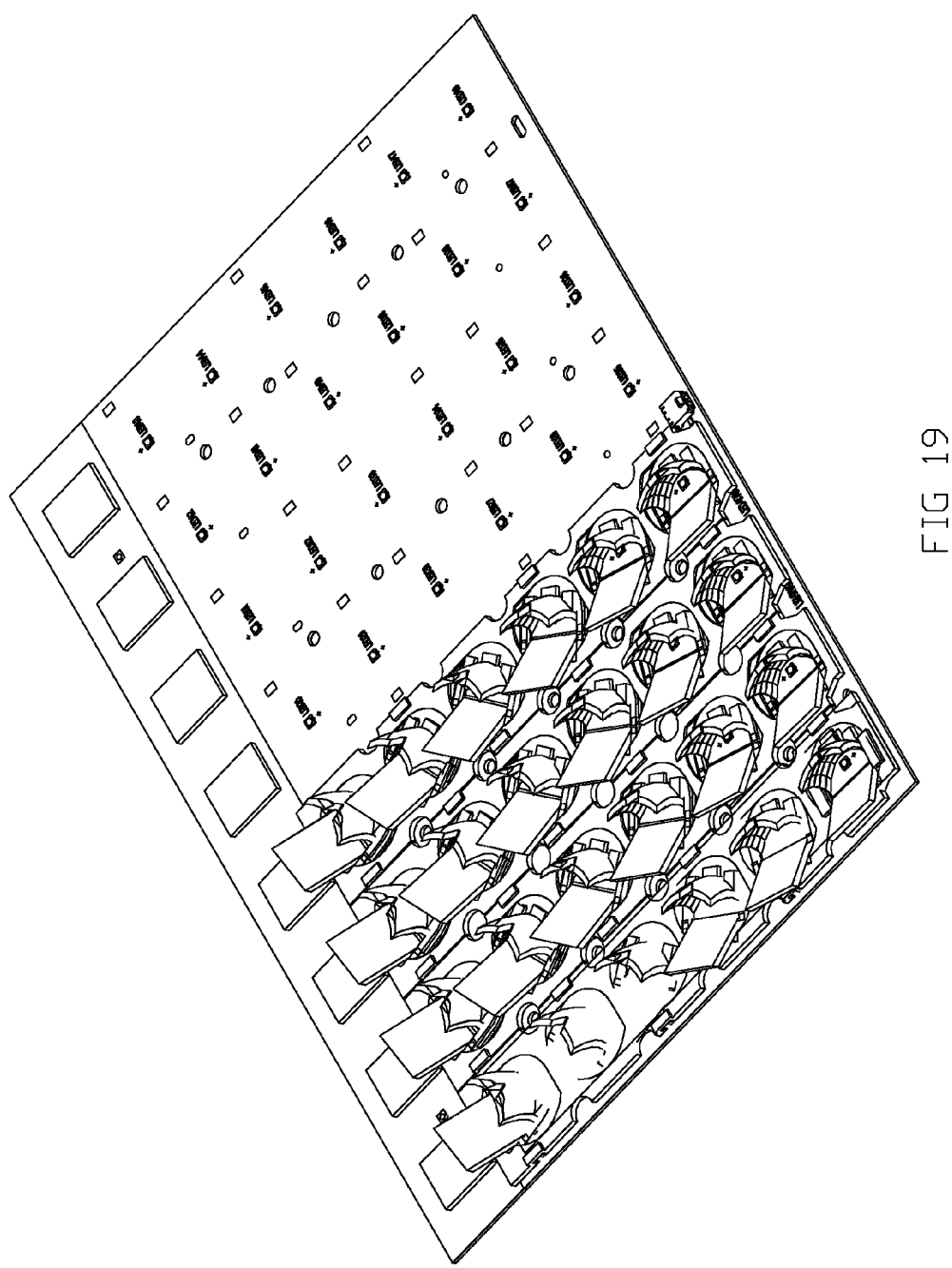

FIG. 19 illustrates a plurality of rotatable optical combinations installed on a mounting plate according to aspects of the present invention.

Figure 20:
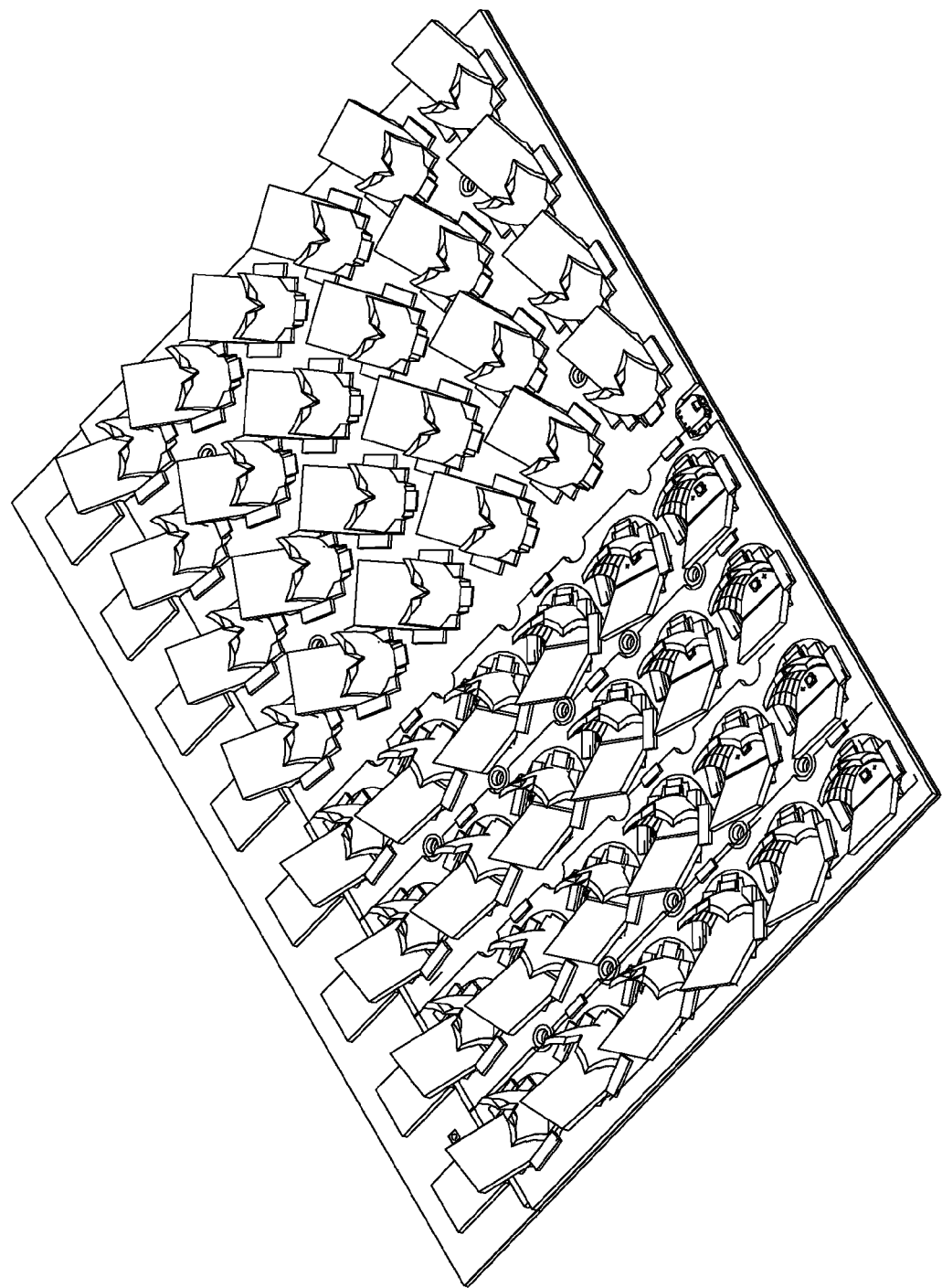

FIG. 20 illustrates a plurality of optical combinations installed on a mounting plate, which are fixed with respect to the mounting plate, according to aspects of the present invention.

Figure 21:
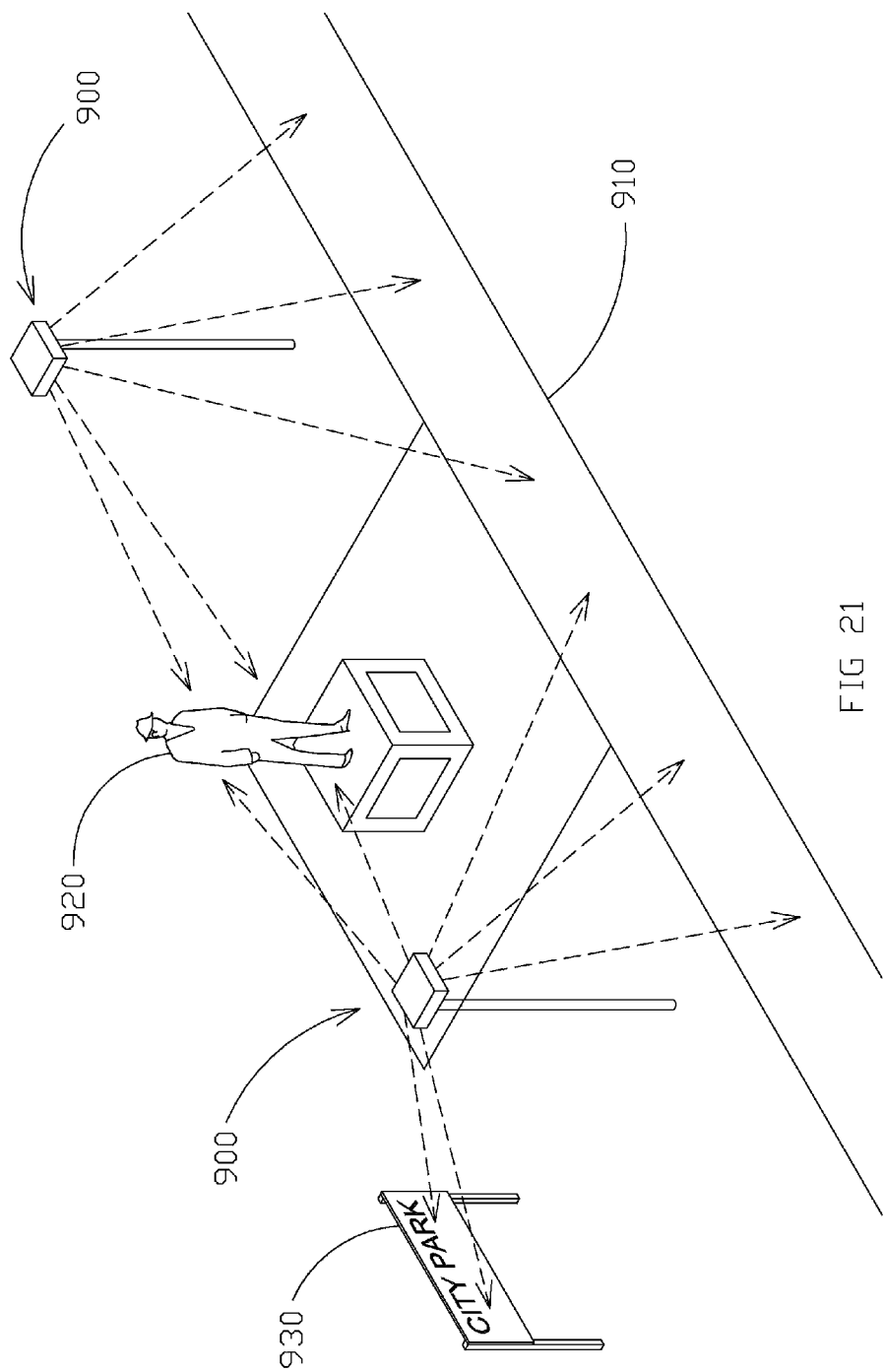

FIG. 21 diagrammatically illustrates single fixtures illuminating plural targets according to aspects of the present invention.

Figure 22:
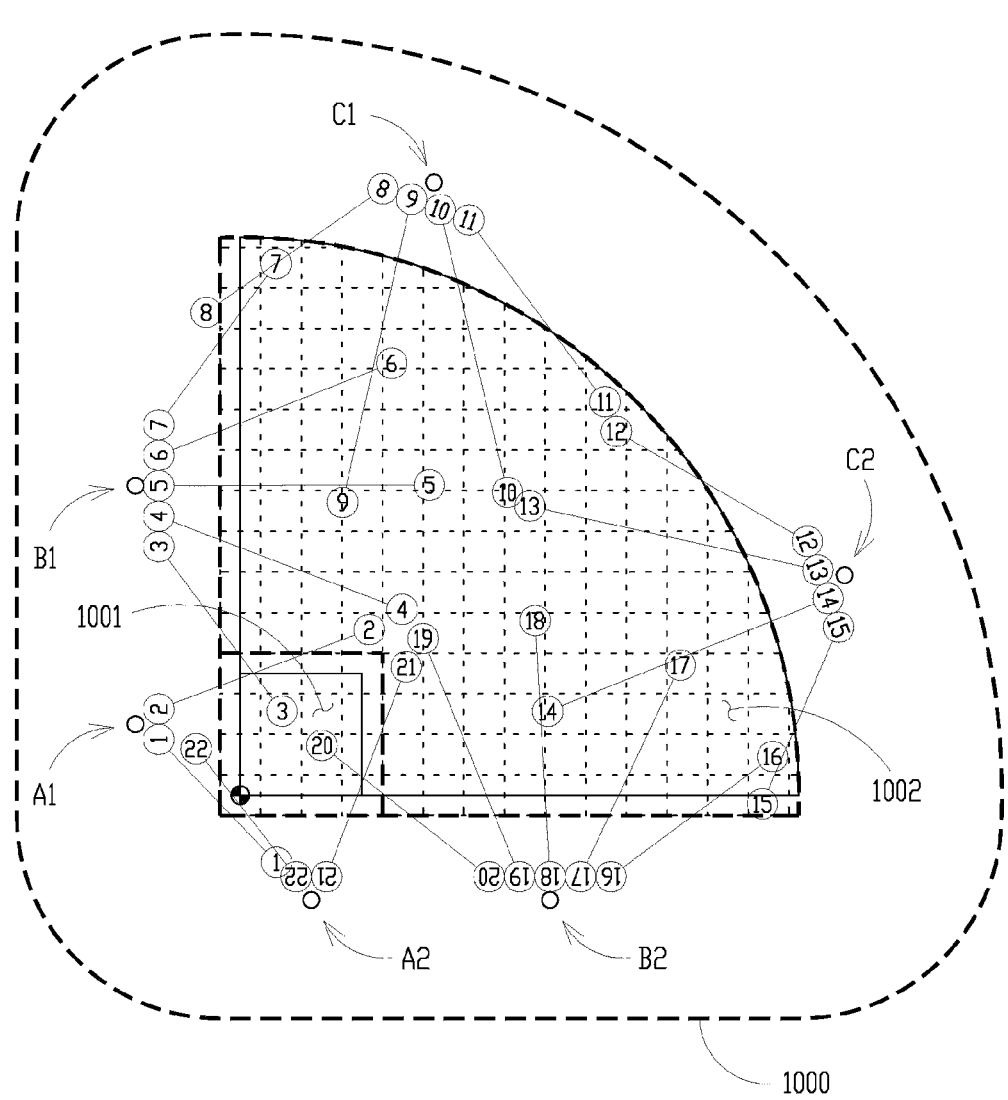

FIG. 22 illustrates one possible conventional lighting design plan view of a softball field indicating aiming points for the lighting fixtures.

Figure 23:
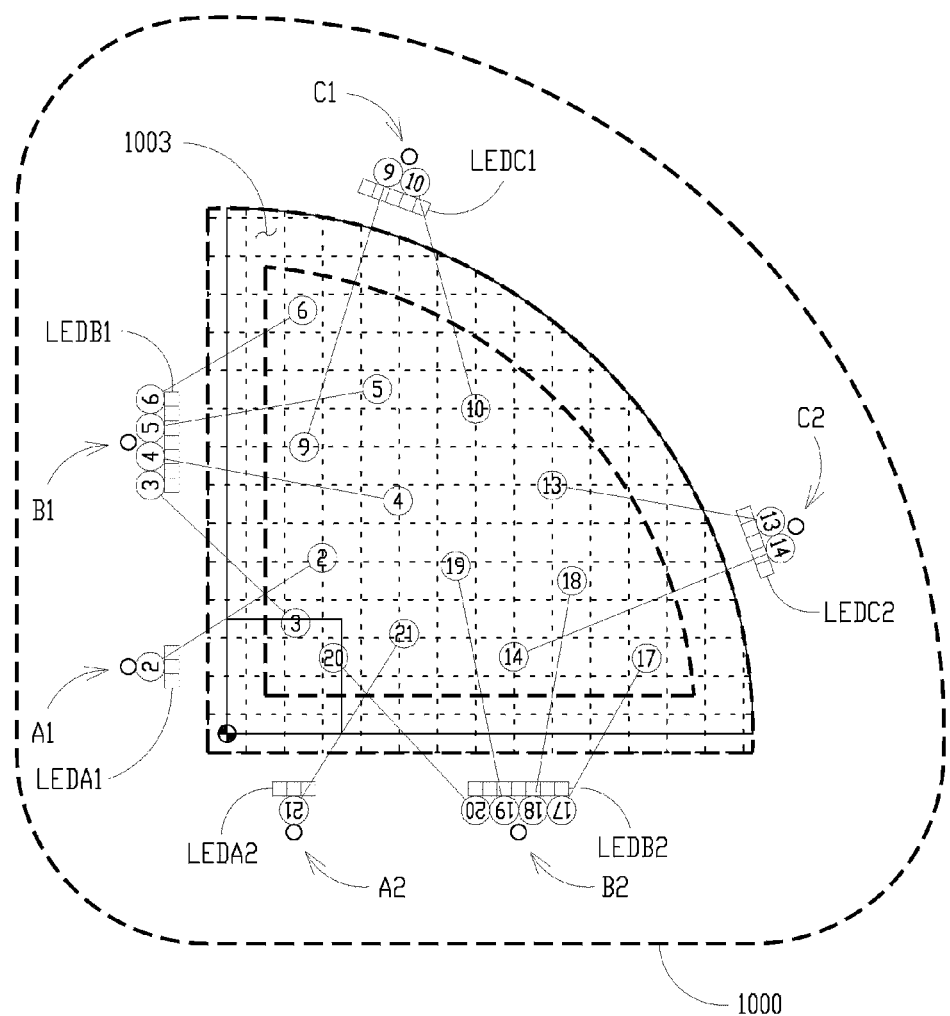

FIG. 23 illustrates the softball field of FIG. 22 with an alternate lighting design according to aspects of the present invention.

Figure 24:
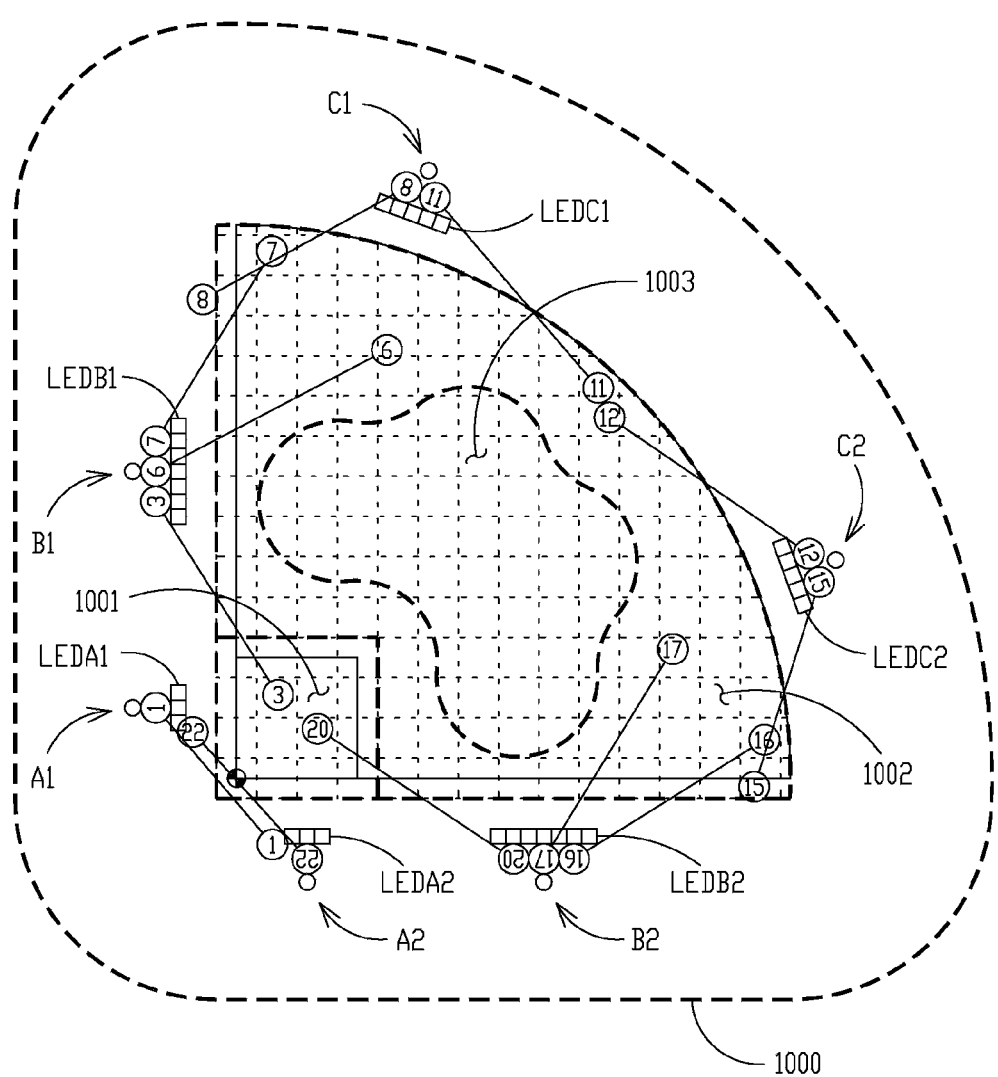

FIG. 24 illustrates the softball field of FIG. 22 with another alternate lighting design according to aspects of the present invention.

The figures have not necessarily been drawn to scale. For example, the dimensions of some of the elements in the drawings may be expanded or reduced to help improve the understanding of the embodiments of the present invention. Moreover, while the invention is amenable to various modifications and alternative forms, specific embodiments have been shown by way of example in the figures and are described in detail below. The intention, however, is not to limit the invention to the particular embodiments described. On the contrary, the invention is intended to cover all modifications, equivalents, and alternatives.

IV. DETAILED DESCRIPTION OF EXEMPLARY EMBODIMENTS

Aspects according to the present invention provide for apparatus, systems, and methods for creating a composite beam from LEDs (or other light sources) and associated optics such as reflectors or lenses. The composite beam may be comprised of light beams from a single LED fixture (see FIG. 2A), light beams from light sources of multiple LED fixtures that are part of a collective group (see FIG. 2B), and/or light beams from a non-LED (e.g., HID) fixture or fixtures (each of which may use one or more light sources) supplemented by light beams from the envisioned LED fixture(s).

With respect to FIGS. 1A-E said fixture(s) contains a plurality, which may be a large plurality, of individual light sources 20 and their associated optics. Associated optics may include reflectors 30, refractive lenses 60, TIR lenses 50, or other lens types. The determination of which type of associated optics elements to use may be based on applicability to a particular use, which may include considerations of type and shape of fixture (e.g. in order to consider such things as wind loading aid aesthetics), mounting angle, ambient conditions, etc.

1. Exemplary Method for Designing a Lighting System—Overview

In general, one employing aspects of the present invention will first analyze the intended application, then select individual optics, and design the composite beam. Of course, this process may be iterative given possible design conditions and constraints.

a. Analyzing the Application

In analyzing the application, a determination will be made regarding the size and shape of the intended target area and desired illumination level based on intended usage, yielding a total desired lumens value or figure. Then a determination of the minimum number of fixtures of the type anticipated to be used may be made, based on the number of lumens per light source and number of light sources per fixture which must provide the required total lumens. These values, parameters, or figures will then be modified, based on requirements for the target area (e.g., preferred, allowable, and prohibited fixture mounting locations; fixture setback from the target area, mounting height, calculations of angle of incidence of the illumination, consideration of the inverse square law of optics, etc.). Given these items, using one of several possible methods, a lighting designer or some other person(s) will begin designing the light layout to provide desired illumination of the target area. This will be similar to designing using conventional HID or LED fixtures. However, the designer may plan lighting at a much finer scale since the individual light sources each contribute a small amount to the total light applied to the entire target area. Additionally, unlike using conventional HID or LED lighting, if there are any areas for which the amount of light should be increased or reduced, this may be accomplished by changing the aiming of a few individual light sources without necessitating a significant reduction or increase in light on adjacent areas.

i. Select or Design Individual Optic

If satisfactory individual optics for the given application are already in existence, one or more types may be selected to potentially meet the needs of the application which has been previously analyzed. If not available from previous design, new ones may be designed. According to aspects of the present invention, one method that may be used is as follows.

One advantage of the present invention is that a single optic, or limited number of optics, may be used to create multiple lighting configurations. This is done via an optic that creates a portion of a beam pattern in an array of LEDs or similar lights to create the desired final beam pattern shape from the luminaire (e.g., IES type V). The desired final beam pattern is created using the aforementioned designed optic with an LED array and positioning a plurality of said optics at various angles to the LED to create the final beam pattern using the sub-pattern from each optic. FIG. 2A illustrates an example of a composite beam 200 formed by sub-beams 210.

While aspects of the present invention may be used for creating area lights having patterns as prescribed by the IES types, the pattern from the luminaire is not constrained to the IES types and may be used to custom configure a luminaire for a specific lighting task.

b. Select or Design Fixtures

Within the design process, individual fixtures will be selected for use with the appropriate optics. These fixtures will be placed in groups on support structures (e.g., poles) or in mounting locations according to the overall plan for the application. At this point the original design considerations and selection of optics will be re-examined and changes made as necessary to fine-tune the design.

2. Detailed Development of Optics

The development of an optic for a sub-beam is now described according to certain aspects of the invention.

a. Deficiencies of Parabolic Optics

While a parabolic optic is easily designed and may be used in embodiments of the invention, other types of optics may provide more desirable results. It is well known that a parabolic surface when combined with a light source at the parabolic focus produces a spot beam that is aimed along the axis of the parabola. This spot beam may be directed by pointing the parabolic axis in the desired direction. However, one disadvantage of the spot beam from the parabola for area illumination is that the intensity profile from the reflector will create a non-uniform distribution on the area being illuminated, with an intense spot in the center with a sharp transition to zero light on the edge. This is ordinarily not an optimum output beam for use in illuminating areas. A desirable pattern usually contains a more uniform distribution with light directly below the luminaire smoothly transitioning to the edge of the beam.

Aspects of the present invention provide for systems and methods for developing several different beam types from a single optic that has been specially designed to allow for the smooth blending of a sub-beam into a composite beam. This is accomplished with a single optic rather than multiple optics, a single development cycle, and a single piece to inventory, resulting in distinct advantages in cost and speed to market.

Aspects of the present invention provide for creating a modified parabolic shape to produce an output beam that both projects a spot to be used as a sub-beam, and creates a smooth distribution on the area being illuminated in order to have sub-beams that may be combined to create desirable illumination beams from the full luminaire. An example angular output for a parabola pointed at 70° to nadir and an CREE (Durham, N.C., USA) model XRE White LED is shown in the graph in FIG. 6D (units are candela), which illustrates a characteristic spot-type beam from the system. Taking this beam and using it to illuminate a plane 10 feet below the system as an area type light, the distribution on the ground is shown in FIG. 6E (units for the output are foot-candles).

b. Modifying Parabolic Optics

An example starting point with Bezier control points 600 is shown in FIG. 6A. Each control point is parameterized via its X, Y, Z coordinate and its control point weight W. The basic parabola shape produces a spot beam.

The parabolic shape is parameterized using a Bezier polynomial scheme to allow for adjustment of several parameters to control the reflector shape to achieve a desired output distribution. Bezier mathematics are used extensively in computer aided design and are known to those skilled in the art. The result of using Bezier mathematics is a simplified list of points and control points that generally describe the surface and allow for manipulation of the surface through these parameters. The use of Bezier splines for optical design is well documented.

The parameterized parabola is redefined using an automated optimization routine to drive the reflector shape to produce a sub-beam that will produce a more uniform output beam when arranged as with the parabola spot beams above. The optimization routine is a genetic algorithm (see, e.g., Vose, Michael D (1999), *The Simple Genetic Algorithm: Foundations and Theory*, MIT Press, Cambridge, Mass. Whitley, D. (1994); and *A genetic algorithm tutorial*. Statistics and Computing 4, 65-85). A genetic algorithm may be beneficial in solving these types of problems due to the large number of variables and the uncertain behavior of the merit function. The genetic algorithm used may include real valued chromosomes along with tournament selection, crossover, and mutation. Other variations of genetic algorithms may be used as required. The merit function in at least one embodiment is defined as the falloff of illumination from the center of the pattern to the edge of the pattern. The value of the merit function was increased as this falloff became closer to a linear falloff. Of course, depending on the desired use, the merit function may be different for different applications. The merit function is well-known (see, e.g., Press, W. H.; Flannery, B. P.; Teukolsky, S. A.; and Vetterling, W. T. "Bessel Functions of Fractional Order, Airy Functions, Spherical Bessel Functions." §6.7 in *Numerical Recipes in FORTRAN: The Are of Scientific Computing*, $2^{nd}$ ed. Cambridge, England: Cambridge University Press, 1992).

Table 1.0 shows the surface definition of an optic that was created using this merit function. The optic is defined by the 3rd Degree X 3rd Degree Bezier Patch (see, e.g., U.S. Pat. No. 5,253,336 regarding $3^{rd}$ Degree Bezier Patch) Description.

TABLE 1.0

Surface Definition

| Pt # | X | Y | Z | Weight |
|---|---|---|---|---|
| 1 | 9.52 | 7.88 | −0.79 | 1.000 |
| 2 | 11.59 | 6.18 | 5.97 | 1.547 |
| 3 | 7.82 | 4.74 | 13.22 | 2.368 |
| 4 | 6.84 | −0.04 | −0.46 | 1.296 |
| 5 | 9.70 | 1.83 | 3.48 | 2.968 |
| 6 | 5.43 | 3.48 | 10.46 | 3.859 |
| 7 | 3.61 | −4.24 | −0.15 | 0.739 |
| 8 | 5.28 | −0.96 | 4.98 | 1.846 |
| 9 | 3.19 | 1.34 | 9.22 | 0.771 |
| 10 | 0.00 | −2.63 | 0.00 | 1.000 |
| 11 | 0.00 | −2.60 | 6.91 | 2.113 |
| 12 | 0.00 | 0.67 | 9.27 | 0.727 |
| 13 | 0.00 | 4.57 | 11.53 | 1.000 |

Note that only the right half control points are listed as the left half is symmetric about y axis. FIG. 6B is a graphical representation of the untrimmed image (showing control points on both halves), while FIG. 6C is a graphical illustration of the trimmed image based on the trim line described in Table 2.0.

TABLE 2.0

| | Trim Line for Notch | | |
|---|---|---|---|
| Pt # | X | Y | Z |
| 1 | 0 | 0.54 | 0 |
| 2 | 0.213 | 0.54 | 0 |
| 3 | 2.647 | 4.645 | 0 |

After optimization of the shape, the sub-beam has the following angular and illumination outputs as shown in FIGS. 6F and 6G. When the optics are subsequently arranged by rotation around the LEDs to achieve a specific pattern, the resulting output pattern is a more desirable illumination.

c. Exemplary Genetic Programming Algorithm

In embodiments of the genetic algorithm, the variables that are manipulated are the X, Y, and Z coordinates of each control point, along with the Bezier Weight of each control point (see, e.g., Xiaogang Jin and Chiew-Lan Tai, *Analytical methods for polynomial weighted convolution surfaces with various kernels*, Computers & Graphics, Volume 26, Issue 3, June 2002, Pages 437-447). For the specific example, there were 36 variables. The merit function was determined by taking a slice through the luminance data from a single reflector starting at 5 feet from the fixture out to 50 feet from the fixture. The data was taken in 1 foot increments, and then compared to a theoretical uniform line through those same points. The deviation from the line at each point was calculated and squared, and the total difference was the square root of the sum of those squares. The fitness function for the algorithm has to actually increase to show better performance, so the final merit value was 1/(total difference) so that it may approach infinity as the fit to the line got better. The actual code to calculate the fitness is shown below.

```
M1=0
  $DO 5 50
  {
  VALUE ? 0 P1
  M1=M1+((−0.0356*(?)+4.4778)−P1)^2
  }
  RETURN
  LINEDIF=SQRT(M1)
  FITNESS=1/LINEDIF
```

In the specific example, a real valued chromosome was used (in other words, the variables were not converted into zeros and ones) with 36 Genes (the total number of variables). The population size was set to 100. A tournament format was used to determine which chromosomes survived to be parents of the next generation and had 8 individuals compete in the tournament. The tournament selection was random. Crossover was performed using a random crossover mask where a 0 kept the first parents gene and 1 kept the second parents gene and reversed the order of parents to generate a pair of children for each pair of parents. Mutation in the children was allowed using a mutation threshold of 0.3 (30% chance of mutation) with a mutation amount limited to 37.5% (the amount of mutation was chosen randomly to be between 0 and 37.5% if mutation occurred. 1000 generations for the optimization were run.

As will be appreciated by those of ordinary skill in the art, there are likely other combinations that may be used to either speed up the results or obtain higher fitness functions.

3. Exemplary Method—Creating Customized (Non-Standard) Beam Shapes

In accordance with at least some embodiments of the present invention, individual optics may be designed using well-known optical principles to project a beam of a desired shape and distribution.

a. Customized Beam Principles

As one example, an optic may provide a type 5 lateral beam distribution with long vertical distribution, or a type 2 lateral beam distribution with short vertical distribution, or any other desired beam distributions. Design and construction methods for the optical lens and reflector are well known in the art. Fixtures which are nearly parallel to the ground which are illuminating a distant target have an emission angle that is "shallower" relative to the fixture, for which reflective optics may be more appropriate, while fixtures which oriented more vertically relative to the ground, or which are illuminating a target that is less distant or that is directly underneath have an emission angle that is "steeper" relative to the fixture, for which refractive optics may be more appropriate. However, there is considerable overlap between the alternatives and therefore choice of reflective versus refractive may be made according to the circumstances. Alternatively, for some applications, use of both reflective and refractive optics on the same fixture may be appropriate.

b. Design of Composite Beam Per IESNA

Having analyzed the overall application of the light to the target area, and selected or designed the appropriate individual optics, the designer or other person(s) will lay out each individual optic within each fixture to design the composite beam. In order to design a specific composite beam for a given application and target area, several methods may be used which are known to those of ordinary skill in the art. A discussion of several methods may be found in the *IESNA Lighting Education: Intermediate Level*, New York: Illuminating Engineering Society of North America, ©1993, sections 150.5A and 150.5B.

In at least some of the embodiments, light modeling may be used to select the optic design and orientation of the individual light beams to create the composite beam from the fixture. For example, selecting one or more of beam shapes 400-403 shown in FIG. 4 or from other beam shapes, the lighting designer or other person(s), with optional assistance from commercially available lighting software program(s), may produce the desired composite beam shape and intensity. The designer may determine the number and combinations of beam patterns provided by the lenses within the fixtures. For each fixture, the designer may select individual fixtures which use a certain number of reflective and/or refractive lenses. As designed, the selected lenses may be assigned a position and orientation within the fixture such that light is distributed as desired on the target area. In accordance with aspects of the present invention, special consideration may be given to edges of target areas in order to provide even lighting at the edges without excessive spill light beyond the target area.

c. Design of Composite Beam Per Luminaire Equivalence

Another method of designing a specific composite beam in aspects of the present invention is calculating the "luminaire equivalence" of each individual optic combination, using existing or custom lighting design software. Using this method, each individual source is considered as a luminaire. The designer, or other person(s), may select the optic system based on its photometric properties and place the light from each individual source onto the target area as desired. This process may be repeated until the desired composite beam shape and intensity level is achieved. In at least some embodiments, some level of automation may be added to the design software if desired.

d. Design of Composite Beam Per Standard Layout Tools

Another method of designing a specific composite beam in accordance with at least some embodiments of the present invention is to use standard layout tools such as drafting board, computer-aided design software, or other tool(s) to arrange the selected beam shapes to create a composite pattern. For example, if the composite beam pattern desired looked similar to that shown in FIG. 3B then the available optics may be selected based on their distribution and intensity. These individual beams may be arranged to fill the area and multiple beams overlaid to achieve the desired intensity.

Figure 3A:
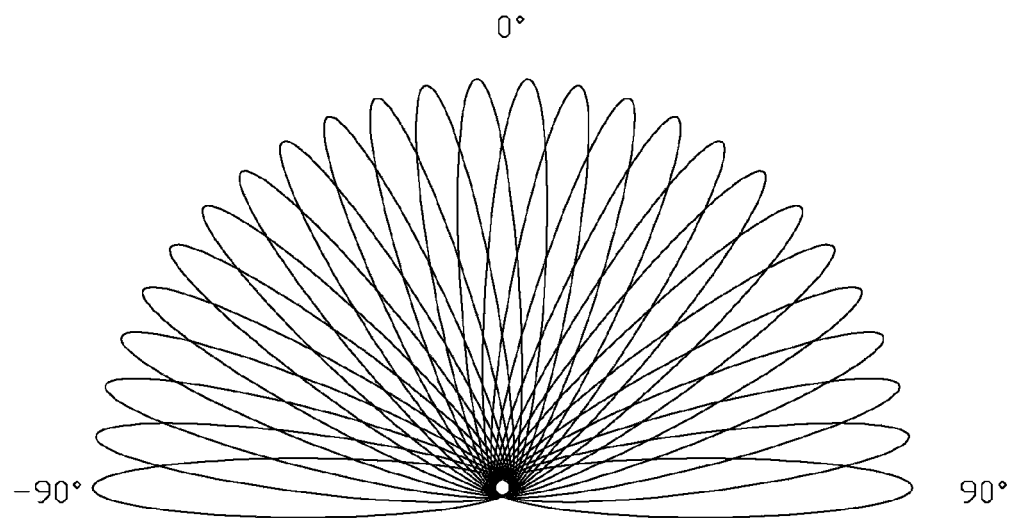
Figure 3B:
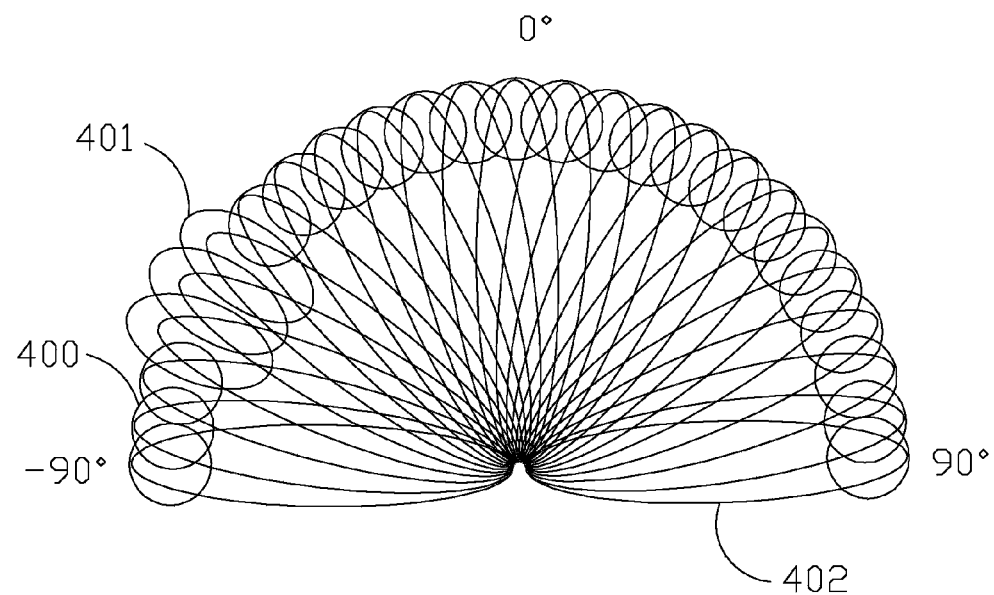
Figure 3C:
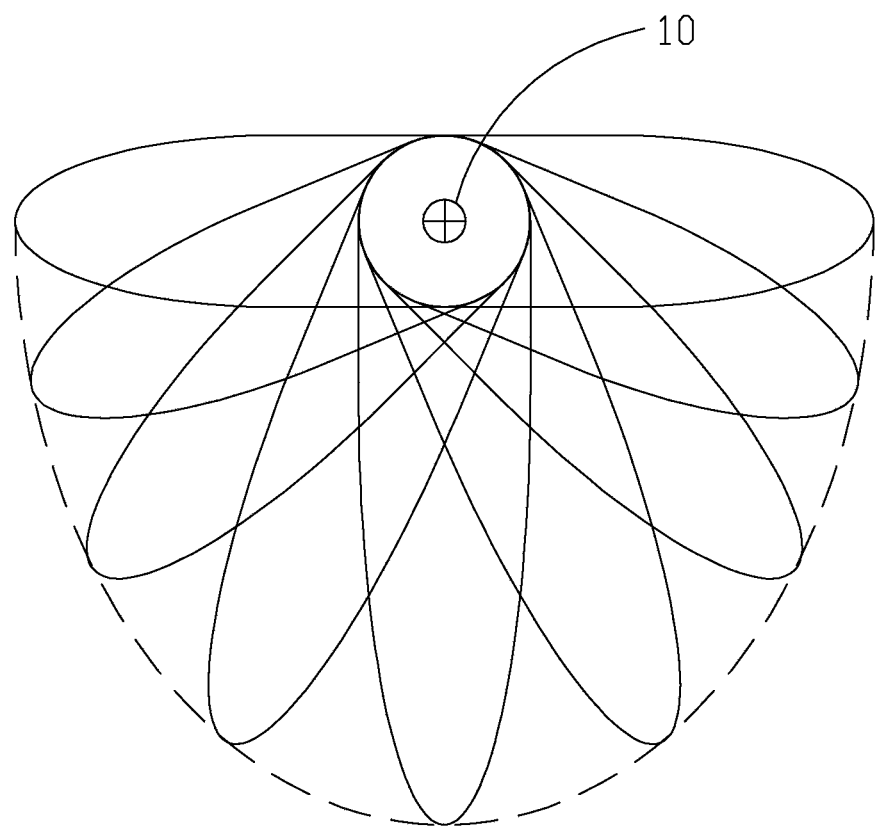
Figure 3D:
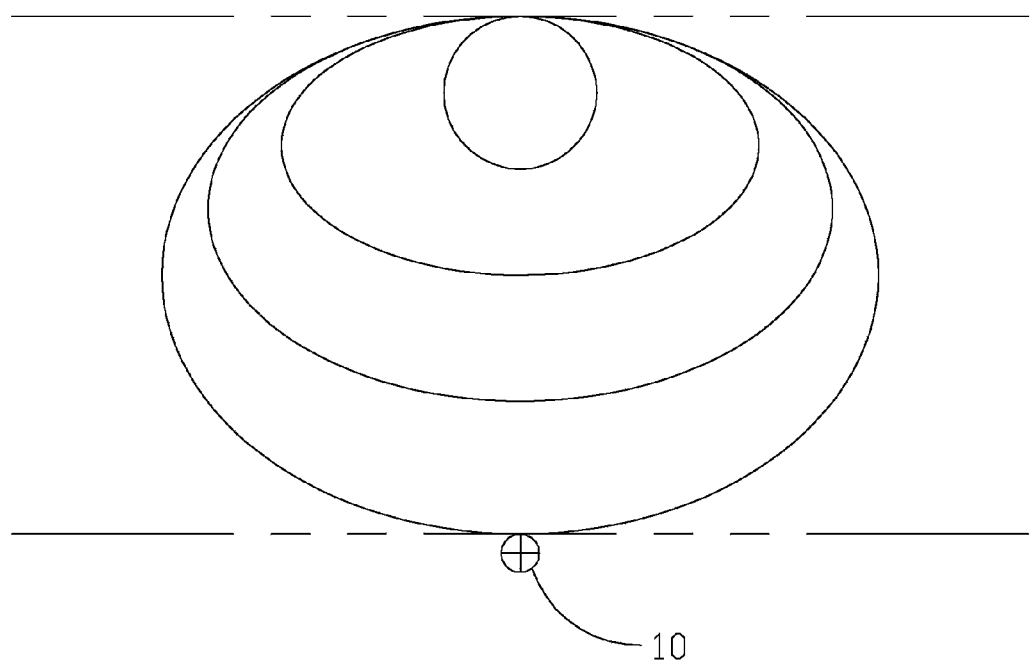
Figure 3E:
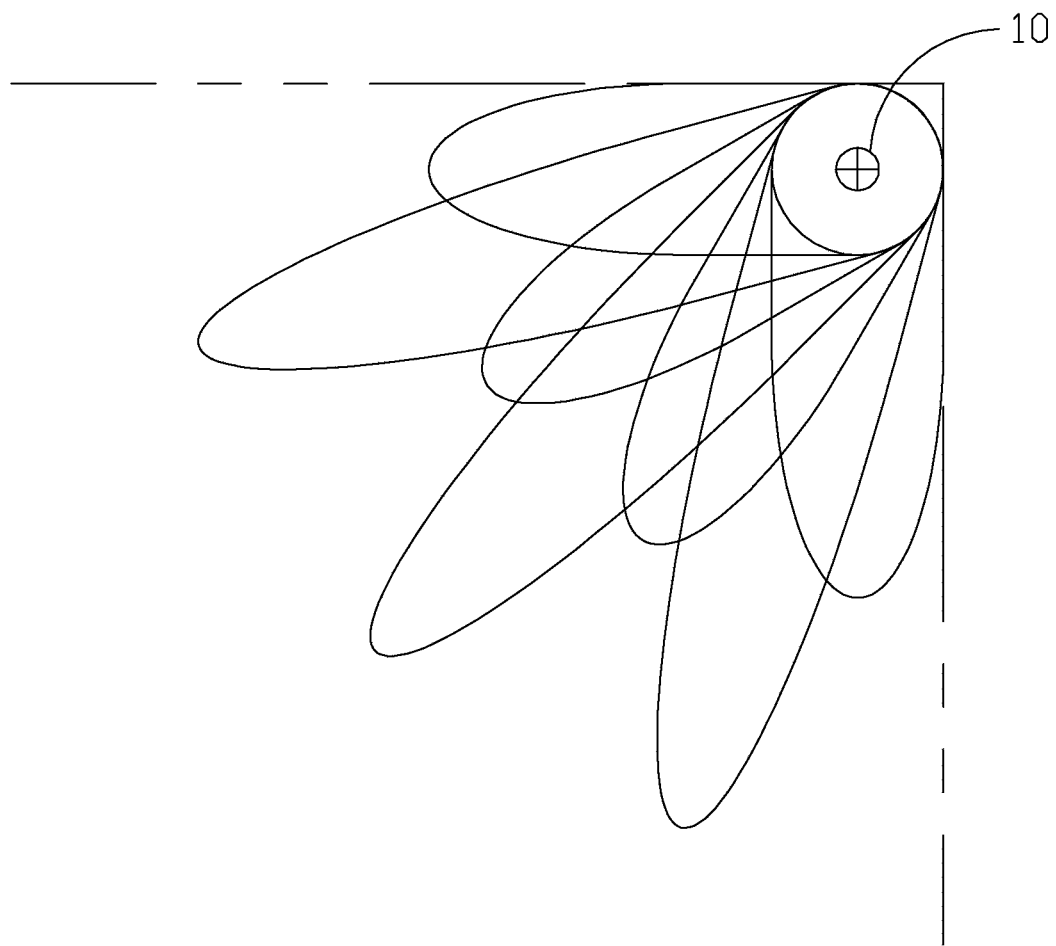

The following Table 3.0 describes the optic selection and orientation of the individual beams from the light source optics system to create the composite beam shown in FIG. 3B.

TABLE 3.0

| Optic type (see FIG. 4) | Reflector Rotation (0 degrees is straight out, 90 is left and right) |
|---|---|
| 400, 402 | 0 |
| 400, 402 | 7.5, −7.5 |
| 400, 402 | 15, −15 |
| 400, 402 | 22.5, −22.5 |
| 400, 402 | 30, −30 |
| 400, 402 | 37.5, −37.5 |
| 400, 402 | 45 |
| 400, 402 | 52.5 |
| 400, 402 | 60 |
| 400, 402 | 67.5, −67.5 |
| 400, 402 | 75, −75 |
| 400, 402 | 82.5, −82.5 |
| 400, 402 | 90, −90 |
| 401 | −45 |
| 401 | −52.5 |
| 401 | −60 | e. Design of Composite Beam Per Other Methods

Other methods of composite beam design are possible and considered included in this application. In addition to designing a composite beam based on the use of a single fixture, embodiments of the present invention may use multiple fixtures to target the same or overlapping areas in order to build up intensity to desired levels based on well known principals of lighting. The composite beams from two or more fixtures may be combined to provide illumination over the entire target area. Further, multiple fixtures may make use of multiple types of light sources (e.g., LED, HID, etc.) such that aspects according to the invention may be used to supplement aspects of conventional lighting.

f. Customized Beam Examples

The following figures illustrate various simplified composite beams in accordance with embodiments of the present invention. FIGS. 12A-C show a composite beam with a relatively narrow beam 240 and large incident angle. FIGS. 13A-C shows a composite beam 250 with a wide beam which projects light at both low and high incident angles. FIGS. 15A-B shows how a fixture 10 of the type envisioned may provide precise illumination on the face of a tall narrow building 280. FIG. 15A illustrates illumination of the desired area of building 280. FIG. 15B illustrates a representation of how the individual beams may be combined to cover the desired areas on the building while essentially avoiding wasted light (also referred to as spill light).

FIG. 15C shows a building as it may be illuminated by a conventional light fixture (e.g., HID) or an LED-type fixture with simple optics. The round beam fully illuminates building 280 but has significant spill light 290. FIG. 15B shows, in simplified form, how the same building may be illuminated by the composite beam from a fixture 10 in accordance with at least some embodiments of the present invention. The multiple individual beams are directed so as to avoid significant spill light but to provide complete illumination of the target area.

Figure 16A:
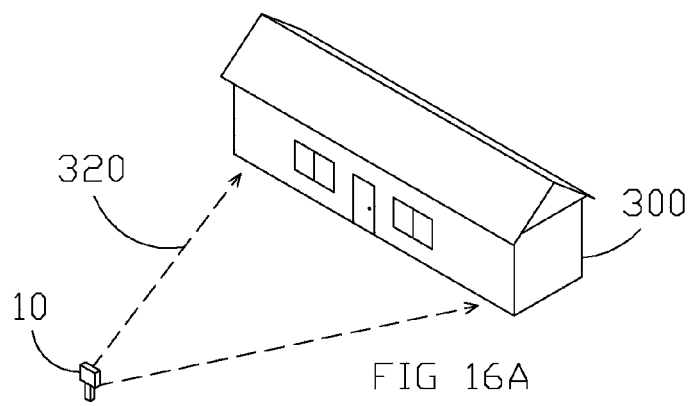
Figure 16B:
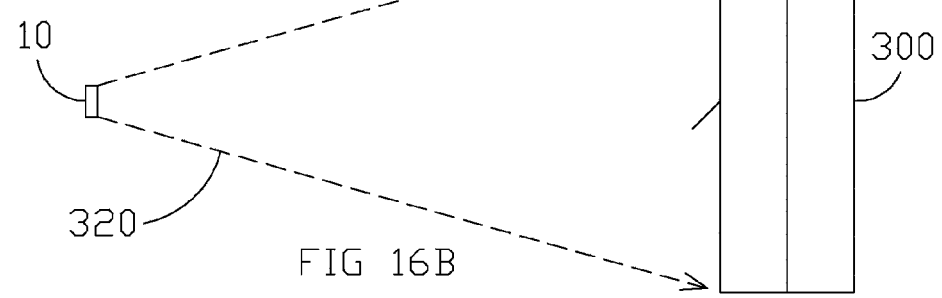
Figure 16C:
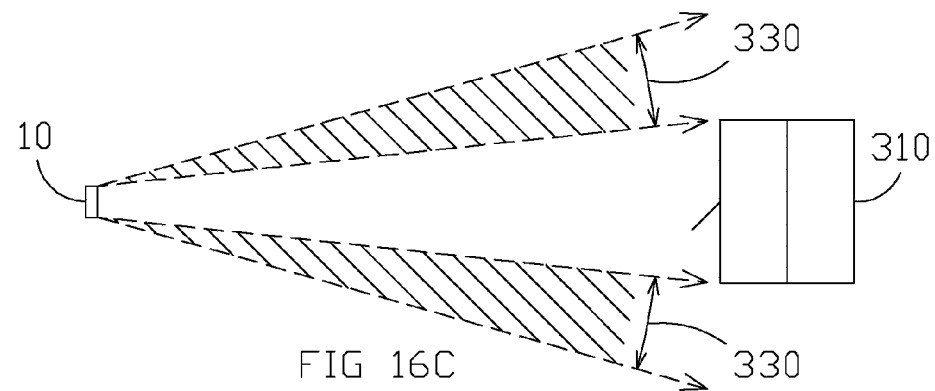
Figure 16D:
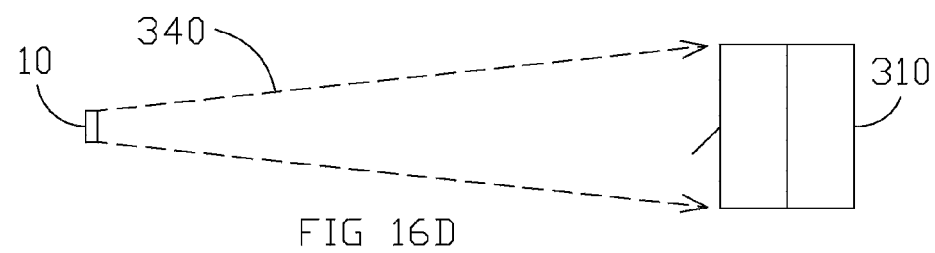

FIGS. 14A-C illustrate another building 270 that may be illuminated by a fixture 10 in accordance with aspects of the present invention. FIGS. 16A-C show how an existing fixture 10 that provides light beam 320 which is suitable for illuminating a wide building 300 produces wasted light 330 and when illuminating a narrow building 310. A modified beam 340, as in FIG. 16D, illustrates how fixture 10 may be designed to provide the correct illumination for building 310 in accordance with aspects of the present invention.

The composite beam of FIG. 3A-E also illustrates how customized, or non-standard, composite beam shapes may be created to fit the needs of special applications. For example, the composite beam of FIG. 3E may be well suited for illumination in the corner of a target area about fixture 10. FIG. 3B also illustrates how the intensity in the distal portion of the beam may be increased by overlaying beams, (beam shape 400 in this example).

4. Exemplary Method Supplementing and/or Replacing Existing Lighting

In accordance with at least some embodiments of the present invention, LED fixtures comprising individual optics designed using well-known optical principles to project a beam of a desired shape and distribution as described herein, may be used to supplement and/or replace conventional lighting fixtures to produce custom illumination for a given application. By way of example and not by way of limitation, exemplary methods as applied to a sports lighting application are presently discussed.

Illustrated in FIG. 22 is a representation of a typical softball field (e.g., measuring 275 ft. on each side) about which poles supporting aimed HID fixtures (diagrammatically illustrated as circles with corresponding reference numbers) are installed. Typically, softball fields such as that illustrated in FIG. 22 have a target illumination level (e.g., 30 horizontal foot-candles (1 fc=1 lumen/ft.$^2$)) in the infield (i.e., area 1001) and a separate target illumination (e.g., 20 horizontal fc) in the outfield (i.e., area 1002), where the target illumination level is compared to the average of illumination measurements made at each grid on the field (in this example, each grid measures 20×20 ft.); this is well known in the art. In addition to achieving a specified average illumination level for an area, it is also generally desirable for no one grid in an area to have a significantly higher illumination than another, nor for the transition between grids to be abrupt (e.g., one grid in the infield measuring 25 horizontal fc and an adjacent grid in the infield measuring 35 horizontal fc may create difficulty in viewing an object traveling between said grids, even though the average illumination of the grids is as specified). Additionally, illumination beyond the field (commonly referred to as spill light) is generally undesirable; this is typically quantified by both horizontal and vertical illumination measurements made 150 ft. from the field (i.e., at external perimeter 1000). These and other illumination requirements necessitate precise placement and aiming of HID fixtures. An example of such an HID fixture can be seen at U.S. Pat. No. 5,075,828, incorporated by reference herein.

As can be seen from FIG. 22, each HID fixture is aimed at a location on the field; this is illustrated by a line projecting from a fixture (e.g., 15 on pole C2) to a spot on the field (e.g., corresponding circle with reference number 15 located on the field); it is of note that fixtures and corresponding illumination points on the field are not drawn to scale, and that, while the number of fixtures per pole and placement of poles about the field is one layout used in the current state of the art, others are possible. See similar illustration for fixtures 1-14, and 16-22, and corresponding aiming points 1-14, 16-22. One limiting factor in adequately illuminating precise areas with an HID fixture is that an HID lamp is large in size (e.g., typically presently on the order of ten inches in length and diameter) and, as such, requires large optical elements (e.g. reflectors, visors, etc. on the order of two feet in diameter) to control and direct the projected light. In practice, it is often impossible to control all the projected light, which leads to undesirable lighting effects (e.g., glare, spill light, etc.), regardless of the accuracy in which the fixture is aimed. For example, fixture 15 on pole C2 is aimed at a spot 15 on the field, but not all of the light produced by the HID light source in fixture 15 will be directed at spot 15; some light will strike different spots on the field, some light will be absorbed by the optical elements of fixture 15, and some light will project upward and outward from fixture 15. Similar issues can exist for one or more other fixtures on any of poles A1, A2, B1, B2, C1, or C2.

One solution is to replace all the HID fixtures illustrated in FIG. 22 with LED fixtures; individual LEDs are small in size (e.g., on the order of less than an inch in length and diameter) and, therefore, more easily controlled by optical elements. However, it would require a significant number of LED fixtures each with plural LEDS to replace the HID fixtures (it is estimated that it may require on the order of 30 LED fixtures each comprising on the order of 40 LEDs to achieve the luminous output of a single typical sports lighting HID fixture), which gives rise to several concerns. One concern is how to support the increased number of fixtures; due to soil conditions, available space, etc., substantially sized support structures (e.g., poles) necessary to support all the LED fixtures needed to illuminate the softball field illustrated in FIG. 22 may not be possible. One solution is to increase the total number of support structures about the field illustrated in FIG. 22 (e.g., ten poles instead of the six A1, A2, B1, B2, C1, C2 illustrated) such that smaller and more conventional poles may be used with fewer LED fixtures per pole, however this may be cost-prohibitive or impossible due to spacing. Another concern is wind loading; to adequately replace all the HID fixtures on pole B1 of FIG. 22, for example, the order of 150 LED fixtures may be required. It is not likely that 150 LED fixtures may be stacked and affixed to a pole in an configuration without experiencing wind loading of a significant magnitude. Another concern is cost; in the current state of the art., 30 LED fixtures, for example, may cost many times over what a single HID fixture costs.

A different solution is to replace just some of the HID fixtures illustrated in FIG. 22 with LED fixtures; the resulting system is illustrated in FIG. 23.

Table 3.1 below illustrates the exemplary change between FIG. 22 and FIG. 23:

TABLE 3.1

| POLE | HID FIXTURES FIG. 22 | HID FIXTURES FIG. 23 | LED FIXTURES FIG. 22 | LED FIXTURES FIG. 23 |
| --- | --- | --- | --- | --- |
| A1 | 2 | 1 | 0 | 3 |
| A2 | 2 | 1 | 0 | 3 |
| B1 | 5 | 4 | 0 | 7 |
| B2 | 5 | 4 | 0 | 7 |
| C1 | 4 | 2 | 0 | 5 |
| C2 | 4 | 2 | 0 | 5 |
| TOTALS | 22 | 14 | 0 | 30 |

The use of LED fixtures in combination with HID fixtures yields benefits not garnered by either individual approach (i.e., all HID fixtures or all LED fixtures) to illuminating the field. For example, the LED fixtures (diagrammatically illustrated as rectangular banks LED A1, LED A2, LED B1, LED B2, LED C1, and LED C2 of plural LED fixtures per bank adjacent to the existing HID fixtures, though this is by way of example and is not to be taken as representative or limiting in the number of fixtures, methods of affixing, or scale) may be aimed using methods described herein to illuminate only outer perimeter 1003 of the field (the area at and around the actual perimeter of the field); doing so allows some of the HID fixtures (particularly those which were aimed near the edges of the field, e.g., fixture 15 of FIG. 22) to be omitted from the design and the remaining HID fixtures (e.g., fixture 20 on pole B2 of FIG. 23) to be re-aimed closer to the center of the field. This results in a dramatic reduction in spill light—unperceivable at and around external perimeter 1000—which is not achievable with the all-HID system illustrated in FIG. 22. Alternatively, as can be seen in FIG. 24, HID fixtures aimed near the center of the field in FIG. 22 may be omitted from the design and the LED fixtures aimed to illuminate center of the field area (see ref. no. 1003 in FIG. 24). This results in a more efficient use of the HID fixtures (as HID fixtures typically produce a wide beam which is not as well controlled, or produces undesirable lighting effects, when illuminating distant targets (as opposed to near targets)), while still receiving the benefits of the LED fixtures.

Further, the use of LED fixtures with a previously all-HID system yields additional benefits: if power is interrupted, LEDs (because of their nature) may be turned back on instantly (whereas HIDs require a significant restart time), which may improve safety and security; LED fixtures are typically more efficient than HID fixtures (e.g., there are no losses due to ballast), which may reduce energy consumption; and LEDs may be focused and aimed to produce a highly uniform composite beam, which may improve lighting uniformity beyond that achievable by an all-HID system (as specified by the aforementioned illumination measurements). Poles used to support HID fixtures are well known in the art, are commercially available, and are already designed (in many cases) to support weight from fixtures added at a later time, scoreboards, radio tower components, etc. Adding a small number (compared to an all-LED system) of LED fixtures to existing poles (particularly when removing one or two HID fixtures), as is illustrated in FIGS. 23 and 24, is not likely to require substantial changes, if any.

The example of an LED fixture that can be used with the systems of FIGS. 23 and 24 are LED fixtures 10, as described earlier. The individual plural LEDs 20 can have their light output modified by an optic 30, including but not limited to any of the types (or combinations of types) described earlier. The light output of each LED 20/optic 30 can be individually controlled. This allows highly flexible control of the final illumination of the target area by highly flexible control of individual output of the plural LEDs. And, this flexibility can be substituted for or used to supplement the single-light-source-per-fixture lighting, such as with typical HID fixtures. The specific control of light output of each LED, the number and type of each LED, and the number of LED fixtures can be selected according to the principles described herein.

Note the different selection of HID fixtures and aiming points therefore between FIGS. 23 and 24. Again, the designer can plan the use and aiming of the LED fixtures to more perimeter areas of the field (see ref. no. 1003 in FIG. 23) or use and aiming of the LED fixtures more towards the center area of the field (see ref. no. 1003 in FIG. 24). As previously described, this can include individual control and aiming of individual LEDs in each LED fixture. These are exemplary only. Different use and aiming of the individually controlled individual LEDs are, of course, possible according to desire or need.

5. Exemplary Apparatus—Reflective Lens Fixture

Reflective lenses, which are presently discussed, are one optical element which may be used with solid-state light sources (in this example, LEDs) to direct light to produce a highly controlled and customizable composite beam from a plurality of such light sources.

a. Fixture Construction

Figure 1A:
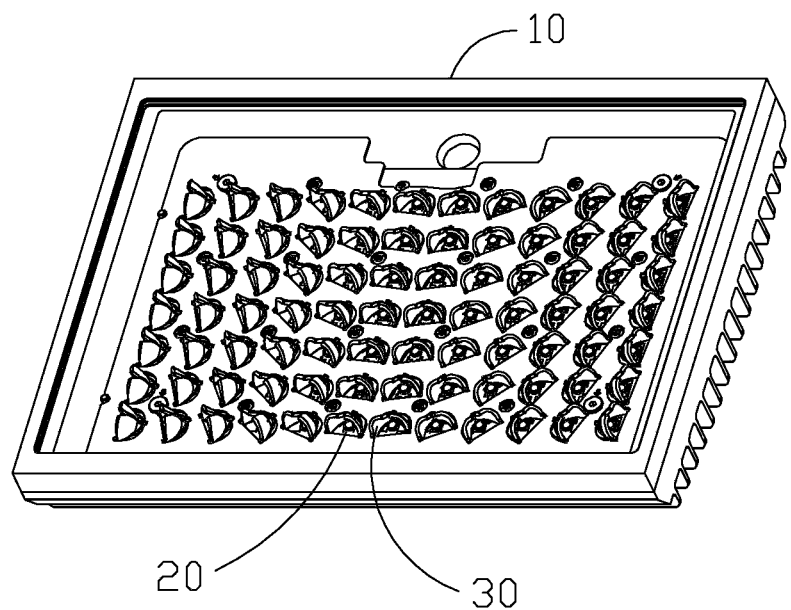
FIGS. 1A and 1B illustrate a fixture according to aspects of the present invention.
Figure 1B:
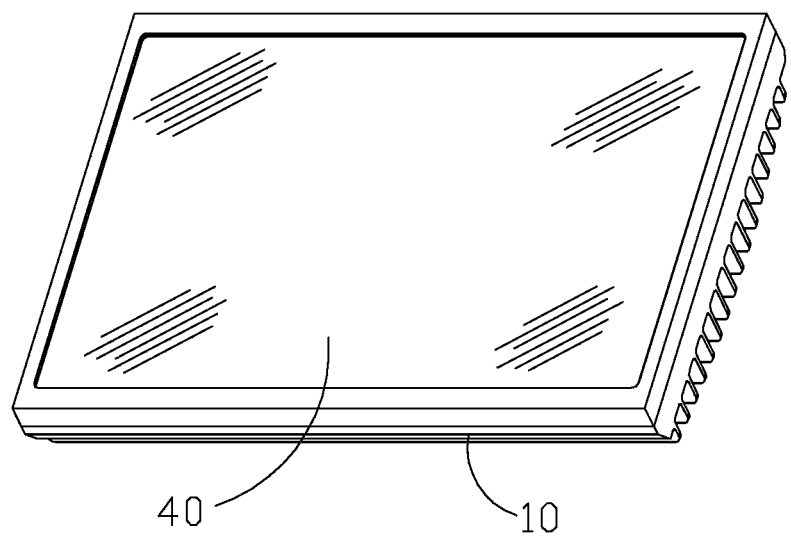

One example of a fixture 10 with individual optics is shown in FIG. 1A. Solid-state light sources 20 are mounted on a circuit board 80, FIG. 1E, or other structure, in an offset row pattern. According to aspects of the present invention, other patterns may also be used. Individual reflectors 30 produce the desired beam pattern from each source and are also mounted on circuit board 80 above each light source 20 and oriented in the desired direction. Reflectors 30 in embodiments of the present invention may be more or less specular, diffusing, and/or absorbing, depending on the desired effect.

Various methods of attaching reflectors 30 to circuit board 80, or other structure, are available. Examples include, but are not limited to, mounting as individual pieces above light sources 20, mounting pins, fasteners or adhesive. An automated pick and place assembly machine may be used in embodiments of the present invention to ensure accurate placement of reflectors 30 and correct orientation per the lighting design. Alternatively, the reflectors May be mounted to a substructure or frame 90, FIGS. 1D and 1E, which provides orientation and indexing.

b. Optics

The individual optic used in the fixture of FIG. 1A is a reflector 30 placed over LED light source 20 which projects the light in a desired pattern, based on the reflector design. The plurality of reflectors are oriented in various directions, providing a beam pattern as illustrated in FIG. 2A as one example of a possible composite beam pattern. Orientation of each reflector 30 is determined based on the desired beam pattern and intensity.

Reflectors 30 may be offset from each other to avoid potentially blocking light from light source 20 to its rear. They include an optional v-shaped notch in reflector 30 (FIG. 6C and FIG. 9) to allow some of the light to be directed downward instead of outwardly. This provides lighting directly below or in front of the fixture. FIG. 5 illustrates an array of individual light sources (#1-#182) in fixture 500 and examples of some possible angular orientations for reflectors 30 in accordance with aspects of the present invention.

Reflectors 30 may be made of various materials depending on application, cost considerations, availability, etc. For example, a reflector 30 may be made of molded plastic with metallized surface, injection molded, machined and polished from aluminum (or other lightweight, thermally conductive material), etc.

An example of a type of adjustment or indexing method may be capturing the individual optics (e.g., lenses) in a circular hole which may have degree or index marks. The optics may be equipped with a screwdriver slot and adjusted to a desired position. Or optics may be positioned by precision equipment which is temporarily indexed to the fixture. Optics may be held in place by a friction fit or by any number of clamping or fastening methods. The optics (e.g., reflector 30) may also be simply positioned in a matrix 90, FIG. 1E, using an indexing system (e.g., cut-outs 95, spacers, bosses, etc.). Additionally, fine-tuning of light distribution may be accomplished on site, and light distribution from a fixture may be modified if needs for a specific location should change.

Figure 1E:
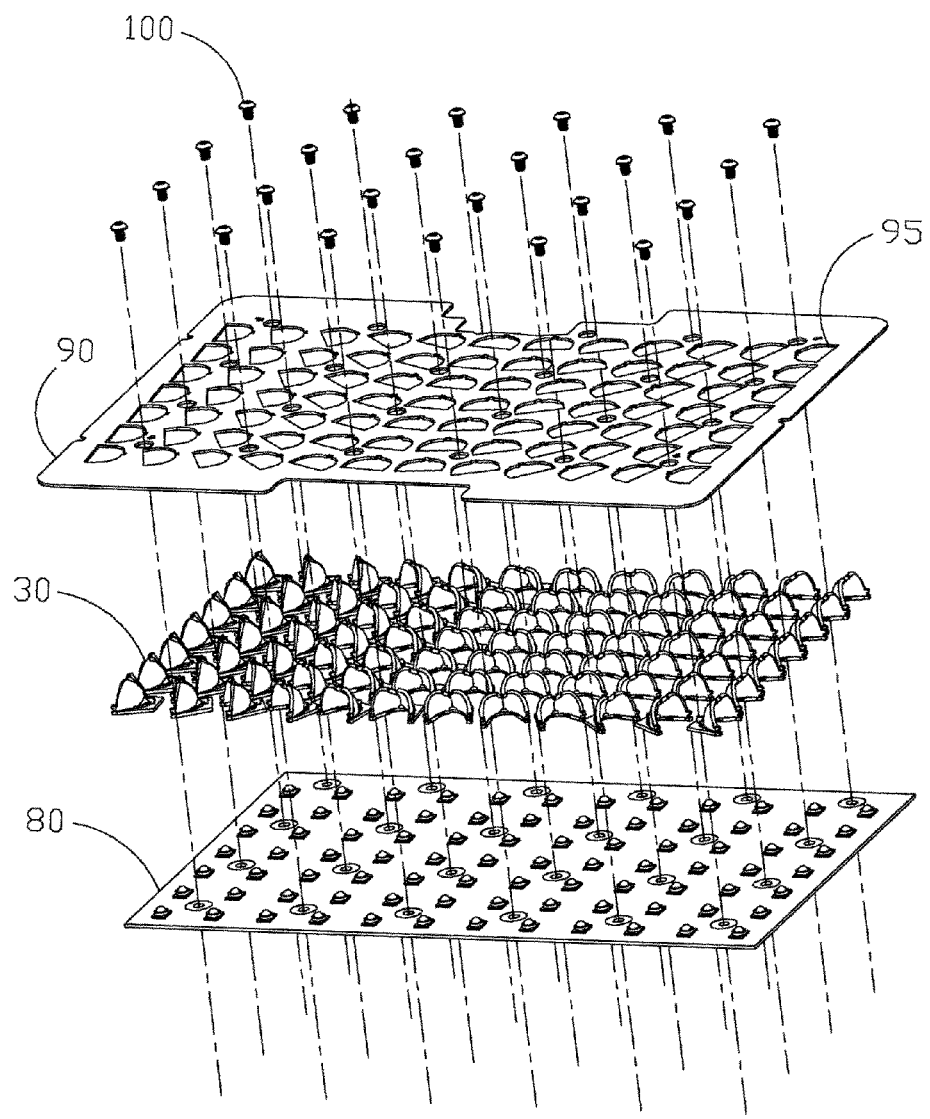
FIG. 1E illustrates a method of assembly of an array of LEDs and optics according to aspects of the present invention.

In accordance with at least some embodiments, the indexing system may be machined or manufactured automatically as part of a matrix (e.g., see reference no. 90); the array of optics may be attached such that the predetermined spacing, rotational positioning, etc., is established and maintained with reference to individual light sources 20 and light fixture 10, by using mounting pins, screws, bosses, etc. that mate precisely with indices in the mounting structure of the individual light sources (see e.g. 100, FIG. 1E). This method of mounting may provide a high degree of accuracy in mounting over a long period of time (on the order of decades of years), and the method of mounting the optic array to the individual light sources relies on a small number of components manufactured to certain tolerances in order to ensure precise indexing of the mating components.

Further adjustments may be included as part of the system to allow adjustment in a plane that is not generally parallel to the fixture. For instance, reflectors 30 may be adjusted by 'tipping' the reflector relative to the mounting plane, (e.g., using trunnion-type mounts 55 with a fastening device (e.g. setscrew 45) or gear and sector adjustments—see FIG. 10). Similarly, overlays may be designed to hold the reflector at a specific 'vertical' angle relative to the mounting surface or template.

c. Example of Beam Layout

Table 4.0 describes one possible method of arranging the individual beams from the light source optics system in FIG. 5 to create a composite beam. In this example, the general composite beam is an IES type 4 shape. The reflectors in this embodiment are all parabolic but other shapes may be used. In this example, the general composite beam is produced with a common optic design of a parabolic nature, used throughout the set of light sources (#1-#182) on fixture 500.

TABLE 4.0

| Source/optic ID # | X (mm) | Y (mm) | Z (mm) | Reflector Rotation (0 degrees is straight out, 90 is left and right) |
|---|---|---|---|---|
| 1 | 0 | 0 | 0 | −90 |
| 2 | 28 | 0 | 0 | 90 |
| 3 | 56 | 0 | 0 | −90 |
| 4 | 84 | 0 | 0 | 90 |
| 5 | 112 | 0 | 0 | −90 |
| 6 | 140 | 0 | 0 | 90 |
| 7 | 168 | 0 | 0 | −90 |
| 8 | 196 | 0 | 0 | 90 |
| 9 | 224 | 0 | 0 | −90 |
| 10 | 252 | 0 | 0 | 90 |
| 11 | 280 | 0 | 0 | −90 |
| 12 | 308 | 0 | 0 | 90 |
| 13 | 336 | 0 | 0 | −90 |
| 14 | 364 | 0 | 0 | 90 |
| 15 | 0 | 28 | 0 | −82.8 |
| 16 | 28 | 28 | 0 | 82.8 |

TABLE 4.0-continued

| Source/optic ID # | X (mm) | Y (mm) | Z (mm) | Reflector Rotation (0 degrees is straight out, 90 is left and right) |
|---|---|---|---|---|
| 17 | 56 | 28 | 0 | −82.8 |
| 18 | 84 | 28 | 0 | 82.8 |
| 19 | 112 | 28 | 0 | −82.8 |
| 20 | 140 | 28 | 0 | 82.8 |
| 21 | 168 | 28 | 0 | −82.8 |
| 22 | 196 | 28 | 0 | 82.8 |
| 23 | 224 | 28 | 0 | −82.8 |
| 24 | 252 | 28 | 0 | 82.8 |
| 25 | 280 | 28 | 0 | −82.8 |
| 26 | 308 | 28 | 0 | 82.8 |
| 27 | 336 | 28 | 0 | −82.8 |
| 28 | 364 | 28 | 0 | 82.8 |
| 29 | 0 | 56 | 0 | −75.6 |
| 30 | 28 | 56 | 0 | 75.6 |
| 31 | 56 | 56 | 0 | −75.6 |
| 32 | 84 | 56 | 0 | 75.6 |
| 33 | 112 | 56 | 0 | −75.6 |
| 34 | 140 | 56 | 0 | 75.6 |
| 35 | 168 | 56 | 0 | −75.6 |
| 36 | 196 | 56 | 0 | 75.6 |
| 37 | 224 | 56 | 0 | −75.6 |
| 38 | 252 | 56 | 0 | 75.6 |
| 39 | 280 | 56 | 0 | −75.6 |
| 40 | 308 | 56 | 0 | 75.6 |
| 41 | 336 | 56 | 0 | −75.6 |
| 42 | 364 | 56 | 0 | 75.6 |
| 43 | 0 | 84 | 0 | −68.4 |
| 44 | 28 | 84 | 0 | 68.4 |
| 45 | 56 | 84 | 0 | −68.4 |
| 46 | 84 | 84 | 0 | 68.4 |
| 47 | 112 | 84 | 0 | −68.4 |
| 48 | 140 | 84 | 0 | 68.4 |
| 49 | 168 | 84 | 0 | −68.4 |
| 50 | 196 | 84 | 0 | 68.4 |
| 51 | 224 | 84 | 0 | −68.4 |
| 52 | 252 | 84 | 0 | 68.4 |
| 53 | 280 | 84 | 0 | −68.4 |
| 54 | 308 | 84 | 0 | 68.4 |
| 55 | 336 | 84 | 0 | −68.4 |
| 56 | 364 | 84 | 0 | 68.4 |
| 57 | 0 | 112 | 0 | −61.2 |
| 58 | 28 | 112 | 0 | 61.2 |
| 59 | 56 | 112 | 0 | −61.2 |
| 60 | 84 | 112 | 0 | 61.2 |
| 61 | 112 | 112 | 0 | −61.2 |
| 62 | 140 | 112 | 0 | 61.2 |
| 63 | 168 | 112 | 0 | −61.2 |
| 64 | 196 | 112 | 0 | 61.2 |
| 65 | 224 | 112 | 0 | −61.2 |
| 66 | 252 | 112 | 0 | 61.2 |
| 67 | 280 | 112 | 0 | −61.2 |
| 68 | 308 | 112 | 0 | 61.2 |
| 69 | 336 | 112 | 0 | −61.2 |
| 70 | 364 | 112 | 0 | 61.2 |
| 71 | 0 | 140 | 0 | −54 |
| 72 | 28 | 140 | 0 | 54 |
| 73 | 56 | 140 | 0 | −54 |
| 74 | 84 | 140 | 0 | 54 |
| 75 | 112 | 140 | 0 | −54 |
| 76 | 140 | 140 | 0 | 54 |
| 77 | 168 | 140 | 0 | −54 |
| 78 | 196 | 140 | 0 | 54 |
| 79 | 224 | 140 | 0 | −54 |
| 80 | 252 | 140 | 0 | 54 |
| 81 | 280 | 140 | 0 | −54 |
| 82 | 308 | 140 | 0 | 54 |
| 83 | 336 | 140 | 0 | −54 |
| 84 | 364 | 140 | 0 | 54 |
| 85 | 0 | 168 | 0 | −46.8 |
| 86 | 28 | 168 | 0 | 46.8 |
| 87 | 56 | 168 | 0 | −46.8 |
| 88 | 84 | 168 | 0 | 46.8 |
| 89 | 112 | 168 | 0 | −46.8 |
| 90 | 140 | 168 | 0 | 46.8 |
| 91 | 168 | 168 | 0 | −46.8 |
| 92 | 196 | 168 | 0 | 46.8 |
| 93 | 224 | 168 | 0 | −46.8 |
| 94 | 252 | 168 | 0 | 46.8 |
| 95 | 280 | 168 | 0 | −46.8 |
| 96 | 308 | 168 | 0 | 46.8 |
| 97 | 336 | 168 | 0 | −46.8 |
| 98 | 364 | 168 | 0 | 46.8 |
| 99 | 0 | 196 | 0 | −39.6 |
| 100 | 28 | 196 | 0 | 39.6 |
| 101 | 56 | 196 | 0 | −39.6 |
| 102 | 84 | 196 | 0 | 39.6 |
| 103 | 112 | 196 | 0 | −39.6 |
| 104 | 140 | 196 | 0 | 39.6 |
| 105 | 168 | 196 | 0 | −39.6 |
| 106 | 196 | 196 | 0 | 39.6 |
| 107 | 224 | 196 | 0 | −39.6 |
| 108 | 252 | 196 | 0 | 39.6 |
| 109 | 280 | 196 | 0 | −39.6 |
| 110 | 308 | 196 | 0 | 39.6 |
| 111 | 336 | 196 | 0 | −39.6 |
| 112 | 364 | 196 | 0 | 39.6 |
| 113 | 0 | 224 | 0 | −32.4 |
| 114 | 28 | 224 | 0 | 32.4 |
| 115 | 56 | 224 | 0 | −32.4 |
| 116 | 84 | 224 | 0 | 32.4 |
| 117 | 112 | 224 | 0 | −32.4 |
| 118 | 140 | 224 | 0 | 32.4 |
| 119 | 168 | 224 | 0 | −32.4 |
| 120 | 196 | 224 | 0 | 32.4 |
| 121 | 224 | 224 | 0 | −32.4 |
| 122 | 252 | 224 | 0 | 32.4 |
| 123 | 280 | 224 | 0 | −32.4 |
| 124 | 308 | 224 | 0 | 32.4 |
| 125 | 336 | 224 | 0 | −32.4 |
| 126 | 364 | 224 | 0 | 32.4 |
| 127 | 0 | 252 | 0 | −25.2 |
| 128 | 28 | 252 | 0 | 25.2 |
| 129 | 56 | 252 | 0 | −25.2 |
| 130 | 84 | 252 | 0 | 25.2 |
| 131 | 112 | 252 | 0 | −25.2 |
| 132 | 140 | 252 | 0 | 25.2 |
| 133 | 168 | 252 | 0 | −25.2 |
| 134 | 196 | 252 | 0 | 25.2 |
| 135 | 224 | 252 | 0 | −25.2 |
| 136 | 252 | 252 | 0 | 25.2 |
| 137 | 280 | 252 | 0 | −25.2 |
| 138 | 308 | 252 | 0 | 25.2 |
| 139 | 336 | 252 | 0 | −25.2 |
| 140 | 364 | 252 | 0 | 25.2 |
| 141 | 0 | 280 | 0 | −18 |
| 142 | 28 | 280 | 0 | 18 |
| 143 | 56 | 280 | 0 | −18 |
| 144 | 84 | 280 | 0 | 18 |
| 145 | 112 | 280 | 0 | −18 |
| 146 | 140 | 280 | 0 | 18 |
| 147 | 168 | 280 | 0 | −18 |
| 148 | 196 | 280 | 0 | 18 |
| 149 | 224 | 280 | 0 | −18 |
| 150 | 252 | 280 | 0 | 18 |
| 151 | 280 | 280 | 0 | −18 |
| 152 | 308 | 280 | 0 | 18 |
| 153 | 336 | 280 | 0 | −18 |
| 154 | 364 | 280 | 0 | 18 |
| 155 | 0 | 308 | 0 | −10.8 |
| 156 | 28 | 308 | 0 | 10.8 |
| 157 | 56 | 308 | 0 | −10.8 |
| 158 | 84 | 308 | 0 | 10.8 |
| 159 | 112 | 308 | 0 | −10.8 |
| 160 | 140 | 308 | 0 | 10.8 |
| 161 | 168 | 308 | 0 | −10.8 |
| 162 | 196 | 308 | 0 | 10.8 |
| 163 | 224 | 308 | 0 | −10.8 |
| 164 | 252 | 308 | 0 | 10.8 |
| 165 | 280 | 308 | 0 | −10.8 |
| 166 | 308 | 308 | 0 | 10.8 |
| 167 | 336 | 308 | 0 | −10.8 |
| 168 | 364 | 308 | 0 | 10.8 |

TABLE 4.0-continued

| Source/optic ID # | X (mm) | Y (mm) | Z (mm) | Reflector Rotation (0 degrees is straight out, 90 is left and right) |
|---|---|---|---|---|
| 169 | 0 | 336 | 0 | −3.6 |
| 170 | 28 | 336 | 0 | 3.6 |
| 171 | 56 | 336 | 0 | −3.6 |
| 172 | 84 | 336 | 0 | 3.6 |
| 173 | 112 | 336 | 0 | −3.6 |
| 174 | 140 | 336 | 0 | 3.6 |
| 175 | 168 | 336 | 0 | −3.6 |
| 176 | 196 | 336 | 0 | 3.6 |
| 177 | 224 | 336 | 0 | −3.6 |
| 178 | 252 | 336 | 0 | 3.6 |
| 179 | 280 | 336 | 0 | −3.6 |
| 180 | 308 | 336 | 0 | 3.6 |
| 181 | 336 | 336 | 0 | −3.6 |
| 182 | 364 | 336 | 0 | 3.6 |

6. Exemplary Apparatus—Refractive Lens

Optical refractive lenses 60, or TIR lenses 50, FIG. 1C, may be placed over the LED light sources 20 to distribute the light, creating a similar effect (i.e., a highly controlled and customizable composite beam from a plurality of light sources housed in one or more fixtures, which may optionally be used with existing conventional lighting). The lenses may be made of various materials depending on application, cost considerations, availability, etc. For example, the lenses may be made of molded plastic, optical glass, etc.

7. Exemplary Apparatus—Visor Strips

According to aspects of the present invention, visor strips 797 as shown in FIGS. 8A-C and are installed in order to limit the angle of emission from the fixture. FIG. 7A illustrates representative light rays 760a-c, 770a-c, and 780a-c emanating from light sources 711a-c in a simplified fixture section 710 according to aspects of the invention. In FIG. 11A, rays 170 and 180 (composed of multiple rays 770a-c and 780a-c, respectively, as represented in FIG. 7A) emanating from light fixture 110 are at an undesirable angle such that instead of illuminating a tennis court 140 they spill over into an adjacent area including a house 120. Installing visor 790 as in FIG. 7B blocks rays 770a-c and 780a-c as desired, but also blocks ray 760c from LED 711c. Installing visor 790 as in FIG. 7C allows transmission of rays 760a-c as desired, but also allows transmission of rays 770a-b and 780a-b, which is not desired. An optional solution according to aspects of the present invention is shown in FIG. 7D. In the embodiment shown in FIG. 7D, installing identical visor strips 797a-c along rows of LEDs in the fixture (note only one fixture section 710 is illustrated) allow rays 760a-c to be transmitted as desired, and blocks the respective rays 770a-c and 780a-c from their undesired paths and redirects them to provide useable light in the target area; this effect is diagrammatically illustrated in FIG. 11B in which target area 140 is adequately illuminated while eliminating illumination at undesirable angle 130 (which, as can be seen from FIG. 11A, was illuminated using the visor system illustrated in FIG. 7A). Visor strips 797 are shown in use with reflective optics; however the strips may be used with refractive or other optics in embodiments of the present invention.

Visor strips 797 may be constructed of metal, plastic, or other materials. They may be coated with various materials to provide any type of surface desired, such as specular, diffuse, or light absorbing. The size, placement, and angle of the visor strips may be calculated in order to provide specific benefits, such as (a) blocking light at a certain angle relative to the fixture, (b) reflecting light down as seen in FIG. 7D in order to provide additional light in a given area (e.g., directly below/in front of a mounting pole/structure). The edges of visor strips 797 may be linear or may be shaped or modified to provide specific light diffusion characteristics. Optionally, instead of having planar surfaces, visor strips 797 may be given shapes that may provide further benefits for control or distribution of light in accordance with aspects of the present invention.

Visor strips 797 may be mounted (a) in a standard configuration per fixture, (b) may be designed and mounted at a specific angle or location according to a custom or semi-custom fixture configuration, or (c) may be adjustable by the installer or user. The mounting angle and height of visor strips 797 relative to the fixture (e.g., see FIG. 7D) may be adjusted in the factory or field. For example, in at least some embodiments of the present invention the fixtures may be adjusted by either a mechanism that provides variable tilt, or by installation of visor strips 797 with a mounting angle that may be specified, or by other methods. Mounting height may be adjusted by shims, selection of different height visors per application, threaded adjustment, or otherwise.

8. Exemplary Apparatus—Light Blocking Tabs

An additional optional feature of exemplary apparatuses is a protruding tab 35, FIG. 9, in the vicinity of the light source which is used to block and/or reflect light which is directly emitted by the light source (rather than being reflected from the reflector). The tab may be made of material which may block or reflect light, and may be more or less specular, diffusing, and/or absorbing, depending on the desired effect, position relative to the source, etc.

9. Exemplary Apparatus—Lens with Individual Visor

It has been discovered that an advantageous and novel approach to LED lighting design is the fact that reflectors which have been configured as optics for single-die LEDs (such as model XP-E or XP-G available from Cree, Inc., Durham, N.C., U.S.) are able to serve as optics for larger 4-die LEDs (such as model MC-E LEDs, also available from Cree). This may allow increased luminous output from a given size of fixture or a reduced size of a fixture by a factor of approximately four. In the current state of the art, fixtures previously sized for single-die LEDs were typically optimized for optical control and had excess thermal rejection capacity. With this option, an optimized luminous and thermal design is produced which may help reduce fixed cost per chip and may reduce the relative cost of packaging and delivering light.

Therefore, in accordance with aspects of the present invention, the individual optic combinations in optical unit 800 as illustrated in FIG. 17A (assembled view) and FIG. 17B (exploded view) comprise a reflector 820 and individual visor 810 which are fixed relative to each other and adjustable relative to the fixture and other individual optic combinations. As one option, reflector 820 and visor 810 are assembled with a rotating shoe 840 and comprise an optical unit which rotates within a mounting plate 830 which is affixed to the circuit board or substrate on which the LED or LEDs are mounted. These pieces may be manufactured separately or molded or otherwise formed as a single piece or multiple pieces depending on manufacturing considerations common in industry, in this embodiment, shoe 840 has two concentric radii 850 and 860 which match radii 870 and 880 in an opening in baseplate 830. This allows the optical unit to rotate on the order of 90° within baseplate 830. To effect 180° beam distribution, baseplates 830 may be constructed as mirror images for right and left sides. Alternatively, the optic combination may be constructed to allow any desired rotational displacement. According to one possible embodiment, LEDs and corresponding optical units are placed at orthogonal distances of 1.375 inches in each direction, with the height of the components being on the order of 1 inch. Other spacing arrangements (such as for instance a hexagonal matrix) and component scales are also possible, and envisioned.

The position of the optical unit is set by an aiming process and its position is held as baseplate 830 is held in proximity to the circuit board or substrate. Alternatively, baseplate 830 may provide stability for the optical unit and each rotating unit may be held in position by an individual screw, clamp, or other apparatus.

Visor 810 cuts off light at a desirable angle and because visor 810 maintains its orientation relative to the light source and reflector 820 as the optic combination rotates, visor 810 ensures that the cutoff effect is essentially the same regardless of the direction of the optic unit. One possible embodiment has a cutoff angle on the order of 65° from the mounting plane of the LED (which may commonly be oriented either near horizontally or vertically, depending on the application), though other cutoff angles are possible, and envisioned. Along with providing a cutoff for light, visor 810 may reflect light in a usable direction, thereby increasing the utilization of the light source. Visor size is determined by the desired cutoff angle and requirements for reflecting light within the optic unit by methods well known in the art of lighting.

In an optional configuration, optical unit 805 seen in FIG. 17E (assembled view) and FIG. 17F (exploded view) comprising a reflector 825 and individual visor 815 may be fixed in location by a mounting plate 875 which rotationally orients and holds unit 805 as desired in relation to the light source. Quick aiming changes may still be accomplished by replacing baseplates 875 with new plates having the desired aiming angle built-in.

Baseplate 830/875 may be designed to hold a single optical unit. This may allow multiple optics to be installed into a fixture using as many baseplates as necessary. Each baseplate may be manufactured to be oriented in juxtaposition with surrounding plates and held in place by fasteners, snap-fits, or by other methods. A structure may also be designed to hold six (see FIGS. 17C and 17D), twelve (see FIGS. 18A and 18B), or some other number of optical units (see FIGS. 19 and 20) in accordance with desired fixture size. Baseplates 830/875 are located with respect to the LEDs (or other light source) with an accuracy on the order of fractions of an inch but are not required to be specifically located with respect to the fixture itself. This may eliminate the need for high precision tolerances between the fixture and the LED board since the LED board (or substrate) and optic units 800/805 do not need to be precisely mated to the fixture.

Baseplates 830/875 having multiple optical units 800/805 may be configured for standard applications to provide customized lighting to different targets within the same fixture, such as in FIG. 21 where individual fixtures 900 each provide illumination to separate targets such as sidewalk 910, statue 920, and sign 930. This is made particularly beneficial by the use of 4-die LEDs which allow a relatively small fixture to provide a sufficient level of lighting for multiple targets.

Additional advantages of aspects according to the invention include the ability to inventory a small number of parts which may be easily configured to customize each fixture either at the factory, after manufacture and prior to installation, or after installation. This provides the ability to manufacture "just-in-time" so that the final destination of a fixture is not determined or set until the aiming coordinates are set at the factory, which may be just prior to packaging for shipment. Units in inventory may easily be configured to meet needs as they arise. Additionally, when fixtures arrive at their installation location as planned, often it is discovered by the installer that conditions have changed necessitating a change in lighting configuration. These changes may be caused by many factors including physical changes to the site, growth of trees or shrubs, repurposing of the area, inadequate or erroneous measurement or documentation of the site, etc. Thus, instead of requiring the purchase of new fixtures and significant delay, the fixtures may be installed with new aiming settings within the range of the original planned installation time, and with greatly reduced additional cost Likewise, site changes after installation may be easily compensated for, and fixtures intended for a particular application may be easily reconfigured if an order is withdrawn or changed.

10. Options and Alternatives

The components described herein are meant to exemplify some possibilities, though combinations of components and/or design of components may differ from those described herein without departing from at least some aspects of the present invention. For example, the individual optic combinations in a fixture may include a mix of refractive lenses and reflectors and may also include reflective tabs or visor strips, or any plurality or combination thereof.

As described herein, combinations of methods and apparatus applied to solid-state light sources (e.g., LEDs) are used to produce fixtures which replace at least some conventional lighting fixtures (e.g., HID) for an existing lighting application. However, this is by way of example and not by way of limitation. For example, exemplary fixtures may be used to provide additional lighting to an existing application without replacing any existing fixtures. As another example, exemplary fixtures may be used with conventional fixtures in the planning of a lighting design for an application.

Various modifications and additions may be made to the exemplary methods and apparatus discussed without departing from at least some aspects of the present invention. For example, while the embodiments described above refer to particular features (e.g., reflectors), the scope of this invention also includes embodiments having different combinations of features and embodiments that do not include all of the described features or provide similar functionality. Accordingly, the scope of the present invention is intended to embrace all such alternatives, modifications, and variations thereof.

What is claimed is:

1. A lighting system comprising: a plurality of first lighting fixtures in combination with a plurality of different lighting fixtures wherein the first lighting fixture comprises:
   a. a housing;
   b. a mounting interface in the housing;
   c. a plurality of individual optical units mounted to the mounting interface in the housing, each optical unit comprising a solid-state light source and at least one associated optic which together produce a light output of customizable characteristics; and
   d. at least two optical units configured to produce light outputs of different characteristics related at least to selection, position, and/or orientation of the optic;

and wherein the different lighting fixture comprises a non-solid-state light source.

2. The lighting system of claim 1 wherein the different lighting fixture comprises an optic sub-system to collect and direct light from the non-solid-state light source into an aimable beam.

3. The lighting system of claim 2 further comprising an elevating support structure to which a said different lighting fixture and at least one said first lighting fixture are mounted.

4. A method of producing a light output to a relatively large target area comprising:
   a. mounting a plurality of individual optical units in a housing wherein each optical unit comprises a solid-state light source and an associated optic which together produce a light output of customizable characteristics, the optic comprising:
   i. a reflective component;
   ii. a reflective component; or
   iii. both a reflective and a refractive component;
b. varying at least one characteristic of at least two optical units to produce light outputs of the at least two optical units that differ;
c. such that the produced light outputs of the at least two optical units are coordinated so to contribute to a composite light output;
d. wherein the composite light output further comprises light output from one or more HID light sources.

5. The method of claim 4 wherein the light output from each HID light source is collected and aimed to an aiming location or point in or about the target area and the light output of each individual optical unit is collected and aimed to supplement light output from the one or more HID light sources.

6. The method of claim 5 wherein the step of supplementing light output from the one or more HID light sources comprises one or more of:
   a. adding light to existing light;
   b. producing more uniform lighting;
   c. filling in gaps in lighting; or
   d. targeting light.

7. The method of claim 6 wherein the one or more HID light sources and plurality of individual optical units are elevated on a same support structure.

8. A method of lighting a relatively large target area with a lighting comprising:
   a. determining a desired light output pattern and distribution at the target area; and
   b. coordinating and configuring a plurality of individual solid-state light sources and associated optics to produce the desired light output pattern at the target area, each optic comprising a larger primary reflector adapted to capture and control a substantial amount of light from the light source in an output direction and a smaller block or secondary reflector to block or redirect a fraction of light from the light source on the aiming direction side of the light source.

9. The method of claim 8 wherein the desired light output pattern and distribution is customized for a given target area.

10. The method of claim 9 wherein the customization is based on an analysis and selection of various output patterns and distributions possible from each light source and optic.

11. The method of claim 10 wherein the customization is further based on an analysis of existing lighting of the target area.

12. The method of claim 10 further comprising providing an inventory of varying light sources and optics for selection of optical units.

13. The method of claim 12 further comprising an inventory amounting interfaces for the light sources and optics relative to a fixture housing, each mounting interface comprising a baseplate for mounting a plurality of light sources and optics in varying orientations to produce varying coordinated light outputs.

14. The method of claim 8 further comprising a non-solid-state light source and reflector producing a light output pattern coordinated with light output patterns from the individual solid-state light sources.

15. The method of claim 14 wherein the combination of non-solid-state and solid-state light sources comprises at least one of:
   a. supplementing the light produced from each other;
   b. promoting uniformity of lighting;
   c. removing need for one or more non-solid-state light sources;
   d. controlling glare and/or spill light;
   e. illuminating substantially different areas.

16. The method of claim 15 wherein the ratio of non-solid-state and solid-state light sources is pre-determined.

* * * * *

UNITED STATES PATENT AND TRADEMARK OFFICE
CERTIFICATE OF CORRECTION

| | | |
|---|---|---|
| PATENT NO. | : 8,602,588 B2 | Page 1 of 1 |
| APPLICATION NO. | : 12/639650 | |
| DATED | : December 10, 2013 | |
| INVENTOR(S) | : Gordin et al. | |

It is certified that error appears in the above-identified patent and that said Letters Patent is hereby corrected as shown below:

In the Claims:

Col. 25, Claim 8, Line 32:
ADD after lighting --fixture--

Col. 26, Claim 13, Line 18:
DELETE after tory "amounting"
ADD after tory --of mounting--

Signed and Sealed this
Twenty-fifth Day of February, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,602,588 B2 | Page 1 of 1 |
| APPLICATION NO. | : 12/639650 | |
| DATED | : December 10, 2013 | |
| INVENTOR(S) | : Gordin et al. | |

It is certified that error appears in the above-identified patent and that said Letters Patent is hereby corrected as shown below:

In the Claims

Col. 25, Claim 4, Line 5:
DELETE after a "reflective"
ADD after a --refractive--

Signed and Sealed this
Eleventh Day of November, 2014

Michelle K. Lee
*Deputy Director of the United States Patent and Trademark Office*